US011128898B2

(12) United States Patent
Denoual et al.

(10) Patent No.: US 11,128,898 B2
(45) Date of Patent: Sep. 21, 2021

(54) METHOD, DEVICE, AND COMPUTER PROGRAM FOR ENCAPSULATING SCALABLE PARTITIONED TIMED MEDIA DATA

(71) Applicant: CANON KABUSHIKI KAISHA, Tokyo (JP)

(72) Inventors: Franck Denoual, Saint Domineuc (FR); Frédéric Maze, Langan (FR); Jean Le Feuvre, Cachan (FR); Cyril Concolato, Combs la Ville (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/870,315

(22) Filed: May 8, 2020

(65) Prior Publication Data

US 2020/0275143 A1    Aug. 27, 2020

Related U.S. Application Data

(63) Continuation of application No. 15/906,927, filed on Feb. 27, 2018, now Pat. No. 10,687,094, which is a (Continued)

(30) Foreign Application Priority Data

Oct. 22, 2013    (GB) ..................................... 1318685

(51) Int. Cl.
*H04N 13/178* (2018.01)
*H04N 13/194* (2018.01)
(Continued)

(52) U.S. Cl.
CPC ... *H04N 21/234327* (2013.01); *H04L 65/607* (2013.01); *H04L 65/608* (2013.01);
(Continued)

(58) Field of Classification Search
USPC ................................ 709/231, 217–221, 230
See application file for complete search history.

(56) References Cited

U.S. PATENT DOCUMENTS 8,190,677 B2 * 5/2012 Myers ............ H04N 21/234327
709/203
10,075,743 B2 * 9/2018 Denoual ........ H04N 21/440245
(Continued)

FOREIGN PATENT DOCUMENTS

| CN | 101971639 A | 2/2011 |
|---|---|---|
| CN | 103026721 A | 4/2013 |
| WO | 2012/070875 A2 | 5/2012 |

*Primary Examiner* — Jude Jean Gilles
(74) *Attorney, Agent, or Firm* — Canon U.S.A., Inc. IP Division

(57) ABSTRACT

Generating a media file, by generating a first data structure assigning a subset of samples of a track to one or more sample groups, each sample of the subset comprising one or more network abstraction layer (NAL) units; generating a second data structure for describing each of the one or more sample groups, the first and second data structures comprising a first grouping type indicating a mapping between NAL units and the one or more sample groups, the second data structure associating a sample group identifier to a NAL unit; generating a third data structure for describing a tile region, the third data structure comprising a second grouping type indicating that the samples of the track comprise one or more tile regions; and, generating a media file including the samples and including a metadata part, the metadata part comprising the first, second and third data structures, and the metadata part comprising a reference grouping type for linking the second and third data structures.

15 Claims, 14 Drawing Sheets

Related U.S. Application Data continuation of application No. 15/030,571, filed as application No. PCT/EP2014/072659 on Oct. 22, 2014, now Pat. No. 10,075,743.

(51) Int. Cl.

| | |
|---|---|
| *H04N 21/84* | (2011.01) |
| *H04N 19/39* | (2014.01) |
| *H04L 29/06* | (2006.01) |
| *H04N 21/2343* | (2011.01) |
| *H04N 21/4402* | (2011.01) |
| *H04N 21/4728* | (2011.01) |
| *H04N 21/854* | (2011.01) |

(52) U.S. Cl.
CPC ........... *H04N 21/234345* (2013.01); *H04N 21/440227* (2013.01); *H04N 21/440245* (2013.01); *H04N 21/4728* (2013.01); *H04N 21/85406* (2013.01)

(56) References Cited

U.S. PATENT DOCUMENTS

| | | | |
|---|---|---|---|
| 10,687,094 B2* | 6/2020 | Denoual | H04N 21/440245 |
| 2008/0114606 A1* | 5/2008 | Ojala | H04L 47/283 |
| | | | 704/500 |
| 2009/0031021 A1 | 1/2009 | Bae et al. | |
| 2010/0153395 A1* | 6/2010 | Hannuksela | H04N 21/85406 |
| | | | 707/737 |
| 2010/0161716 A1* | 6/2010 | Kajos | H04N 21/2662 |
| | | | 709/203 |
| 2010/0189182 A1* | 7/2010 | Hannuksela | H04N 19/44 |
| | | | 375/240.25 |
| 2012/0057635 A1* | 3/2012 | Rusert | H04N 19/33 |
| | | | 375/240.16 |

* cited by examiner

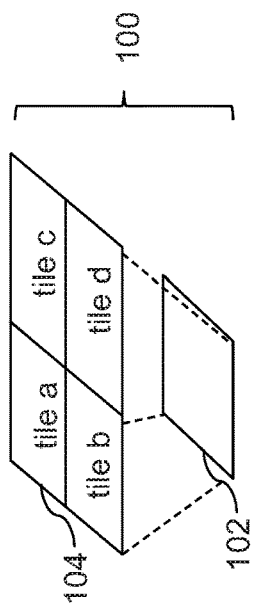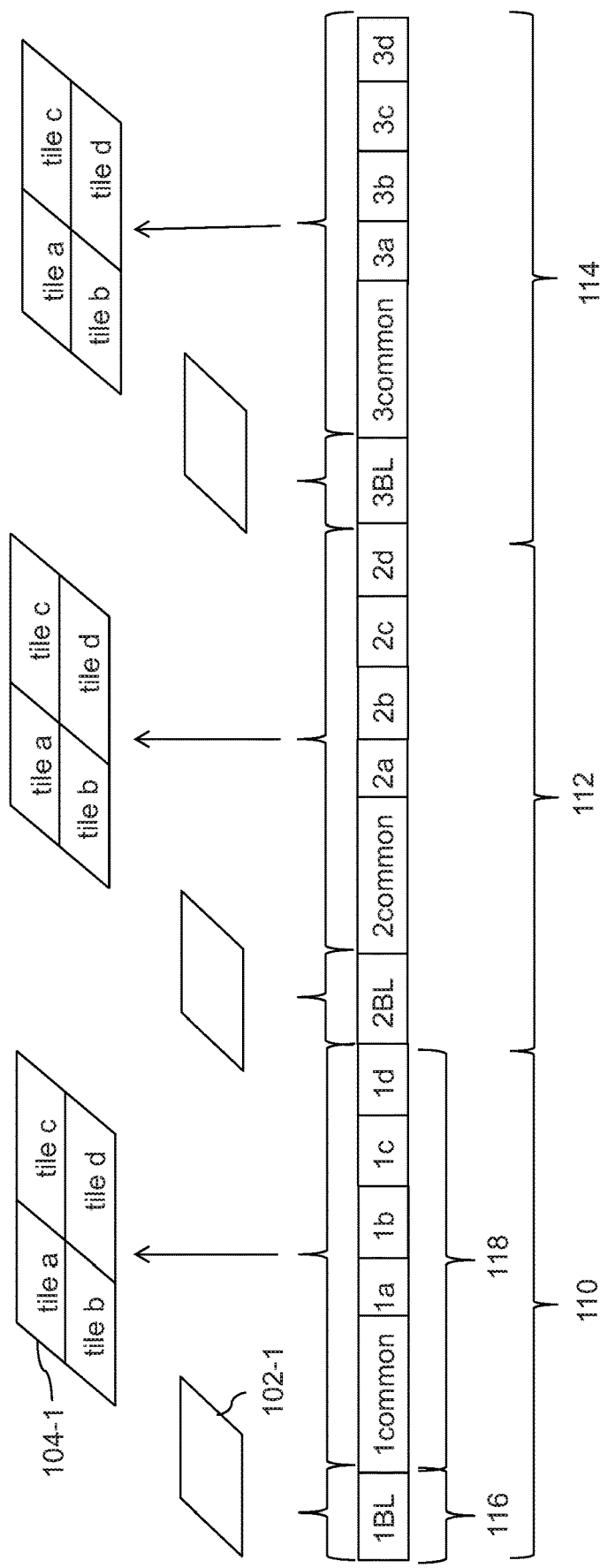

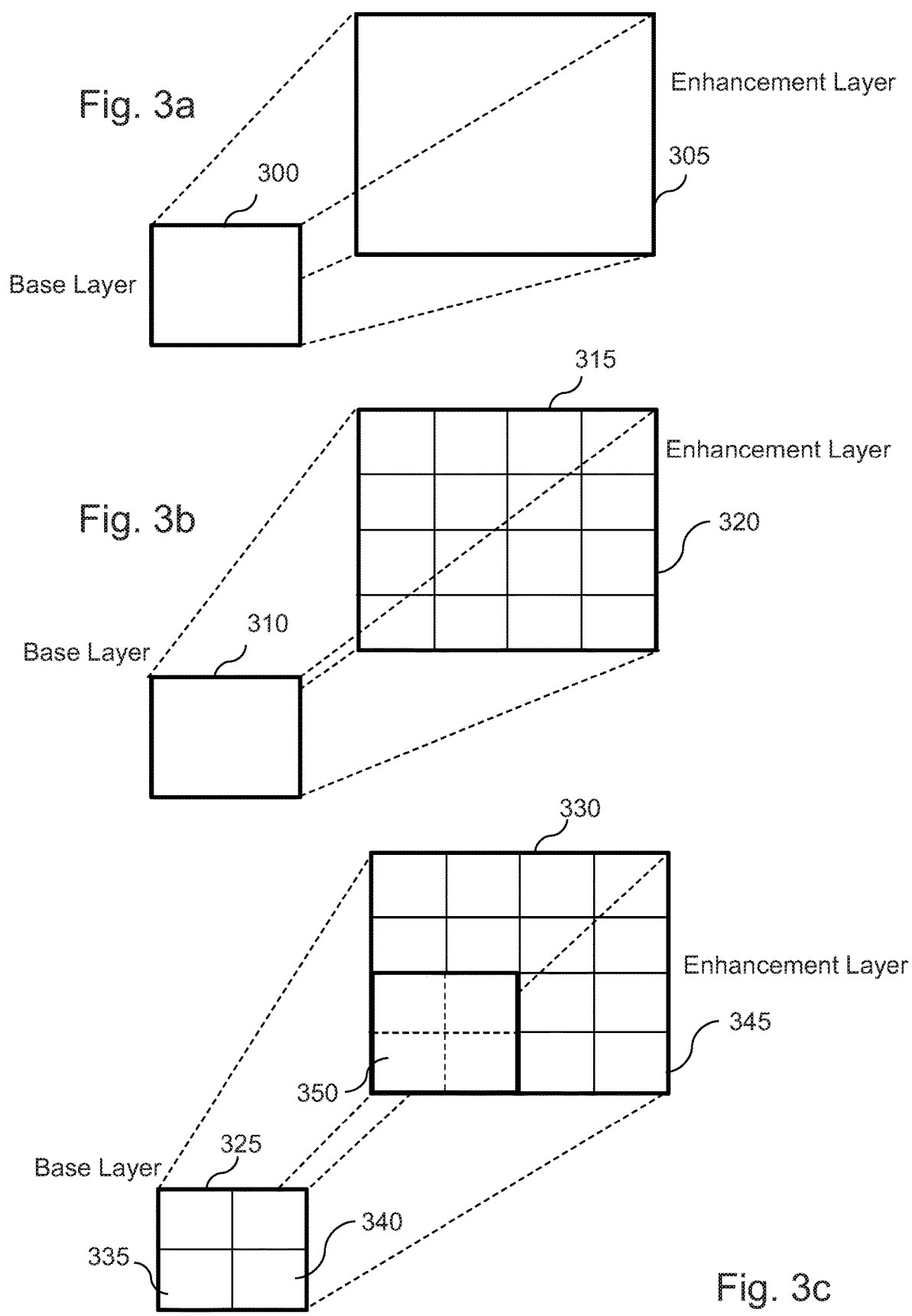

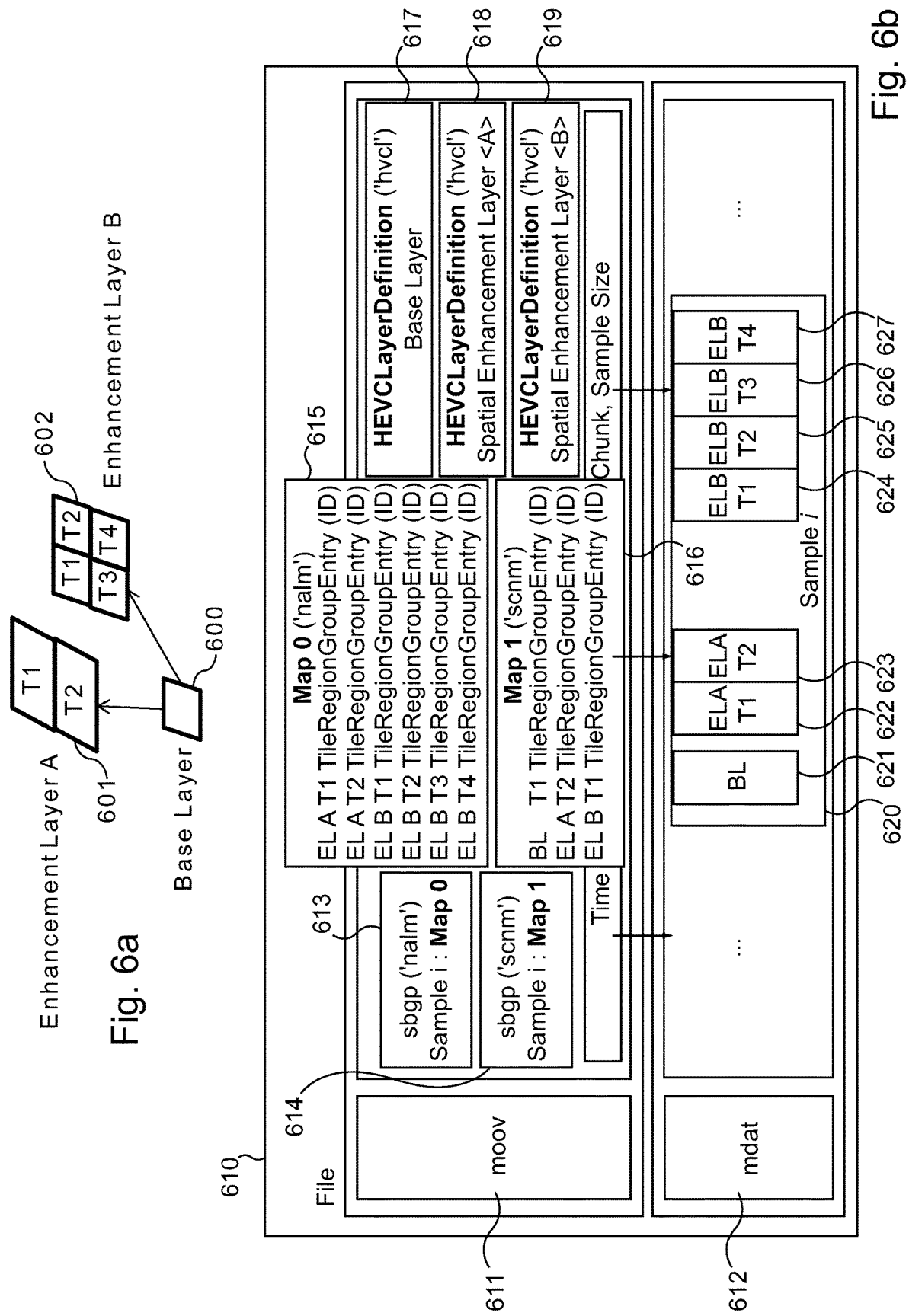

Fig. 8

```
class TileRegionGroupEntry() extends VisualSampleGroupEntry ('trif')
{
    unsigned int(32) groupID;
    unsigned int(32) dependentGroupID;      // inter-tile dependencies
    unsigned int(32) layerGroupID;          // scalability layer
    unsigned int(2)  independent;
    unsigned int(6)  reserved=0;
    unsigned int(16) horizontal_offset;
    unsigned int(16) vertical_offset;
    unsigned int(16) region_width;
    unsigned int(16) region_height;
}
```
800

```
class TileRegionGroupEntry()
{
    unsigned int(32) groupID;
    unsigned int(32) dependentGroupID;
    unsigned int(32) layerGroupID;
    unsigned int(2)  independent;
    unsigned int(6)  reserved=0;
    unsigned int(16) horizontal_offset;
    unsigned int(16) vertical_offset;
    unsigned int(16) region_width;
    unsigned int(16) region_height;
}
```
801

```
class HEVCLayerDefinitionBox() extends VisualSampleGroupEntry ('hvcl') {
    unsigned int(32) groupID;
    unsigned int(32) dependentGroupID;
    unsigned int(16) visualWidth;
    unsigned int(16) visualHeight;
    ......
}
```
802

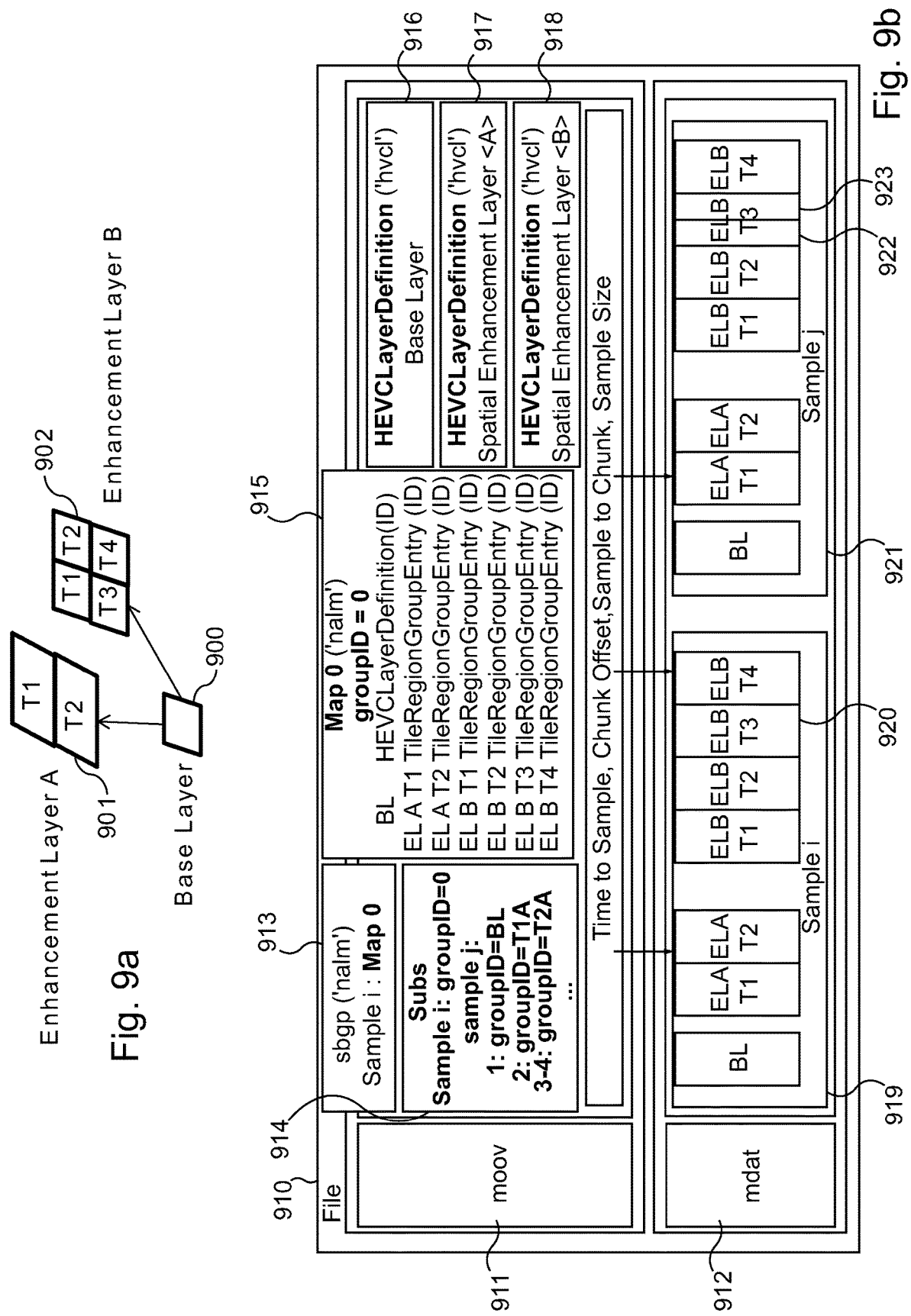

Fig. 10

```
aligned(8) class SubSampleInformationBox extends FullBox('subs', version, 0) {
  unsigned int(32) entry_count;
  int i,j;
  for (i=0; i < entry_count; i++) {       // would be sample count in our case
    unsigned int(32) sample_delta;        // differential timestamp of the sample
    unsigned int(16) subsample_count;     // Ex: number of tiles, slices or groups
    if (subsample_count > 0) {
      for (j=0; j < subsample_count;j++) {
        if (version == 1) {
          unsigned int(32) subsample_size;
        } else {
          unsigned int(16) subsample_size;
        }
        unsigned int(8) subsample_priority;
        unsigned int(8) discardable = 1;
        / sample can be decoded without this sub-sample
        unsigned int(32) reserved;
```

1001

```
if (flags == 0) {
  unsigned int(1) SubLayerRefNalUnitFlag;
  unsigned int(1) RapNalUnitFlag;
  unsigned int(1) VclNalUnitFlag;
  unsigned int(29) reserved = 0;
} else if (flags == 1)
  unsigned int(32) reserved = 0;         // Tile NALUs
else if (flags == 2) {
  unsigned int(2) vcl_idc;
  unsigned int(2) reserved = 0;
  unsigned int(4) log2_min_luma_ctb;
  unsigned int(12) ctb_x;
  unsigned int(12) ctb_y;
} else if (flags == 3 || flags == 4) {   // CTU
  unsigned int(2) vcl_idc;                // or slice
  unsigned int(30) reserved = 0;
} else if (flags == 5) {
  unsigned int(32) groupID;
}
```

1002

1005

1003

1004

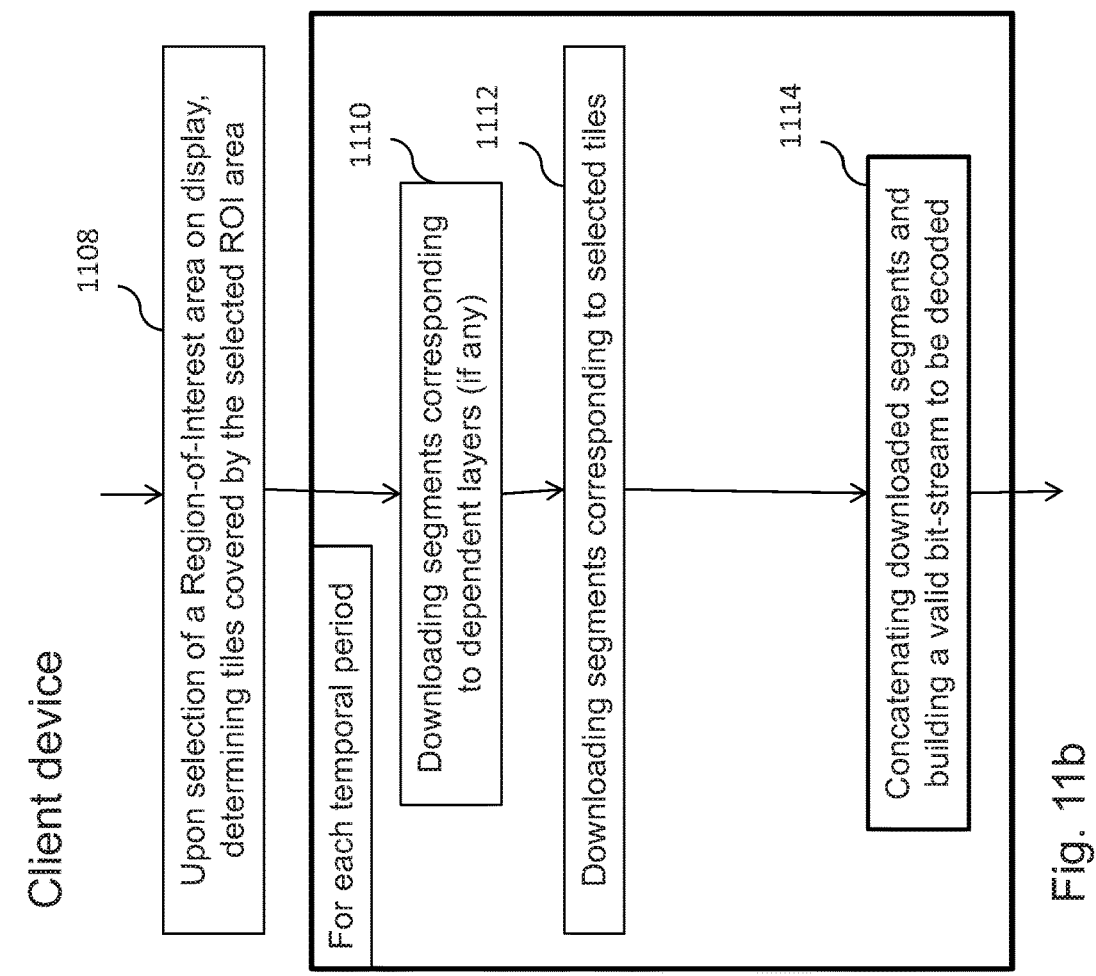
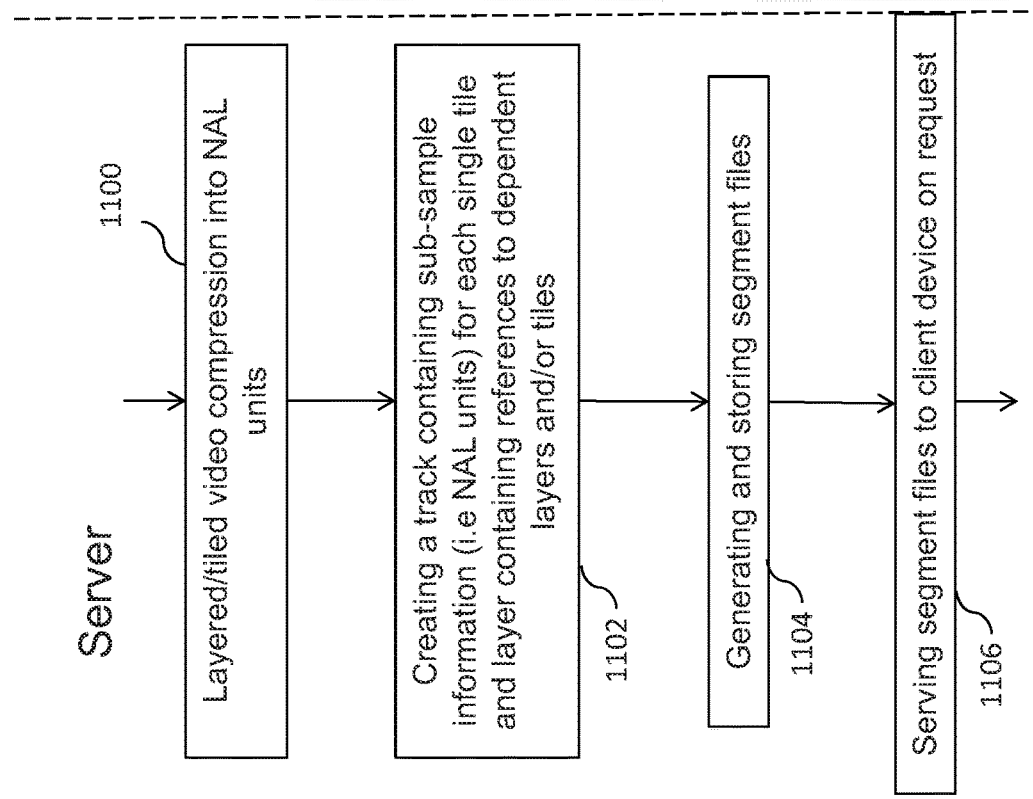

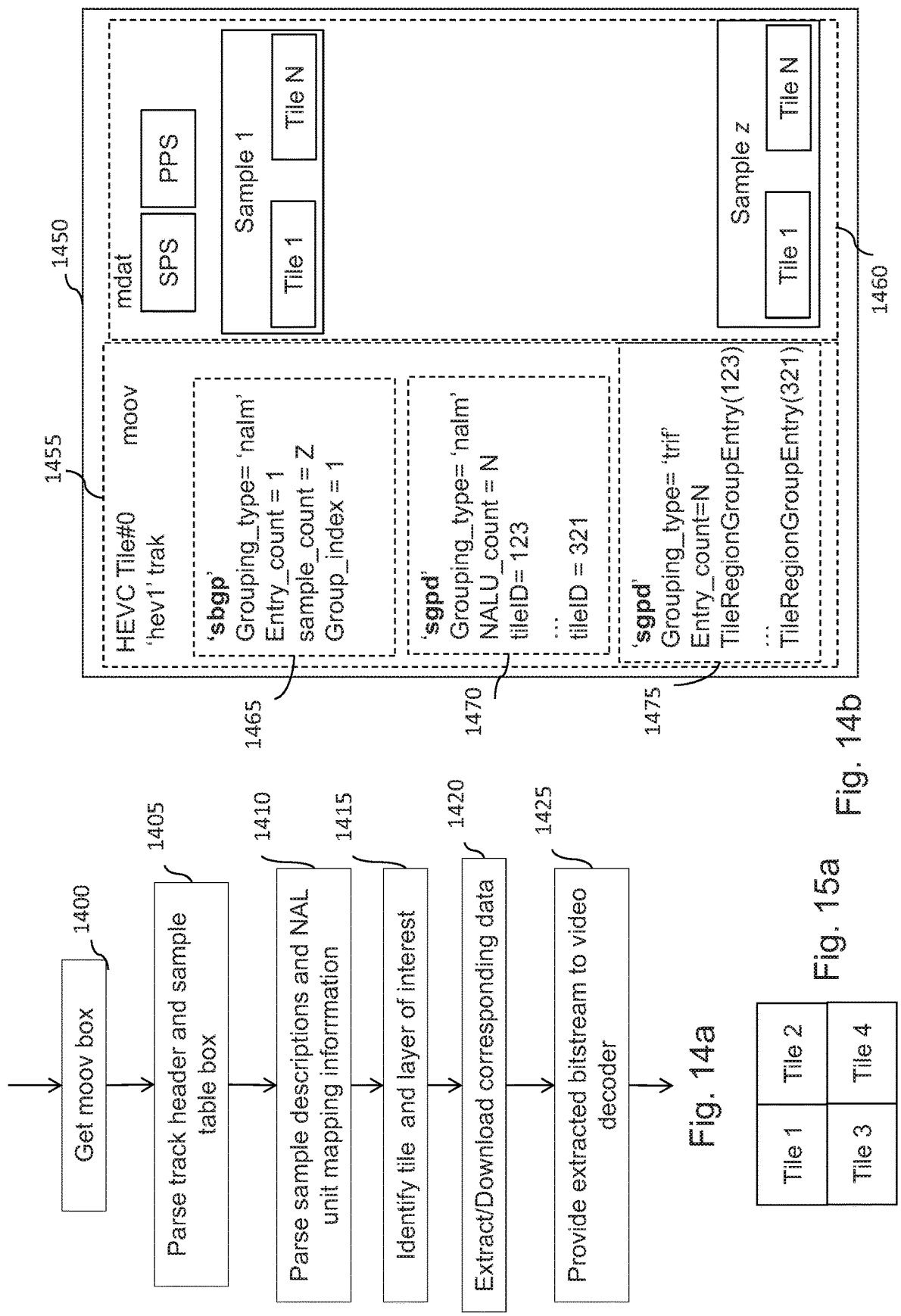

METHOD, DEVICE, AND COMPUTER PROGRAM FOR ENCAPSULATING SCALABLE PARTITIONED TIMED MEDIA DATA

CROSS-REFERENCE TO RELATED APPLICATIONS

This application is a continuation of U.S. patent application Ser. No. 15/906,927, filed on Feb. 27, 2018, which is a continuation of U.S. patent application Ser. No. 15/030,571, filed on Apr. 19, 2016 and now issued as U.S. Pat. No. 10,075,743 on Sep. 11, 2018, that is a national phase application of PCT application no. PCT/EP2014/072659 filed on Oct. 22, 2014 and which claims the benefit under 35 U.S.C. § 119(a)-(d) of United Kingdom Patent Application No. 1318685.3, filed on Oct. 22, 2013. The above cited patent applications are incorporated herein by reference in their entirety.

FIELD OF THE INVENTION

The invention generally relates to the field of encapsulation of timed media data, e.g. according to Base Media File Format as defined by the MPEG standardization organization, to improve stream delivery, in particular regarding HTTP (HyperText Transfer Protocol) streaming of user-selected regions of interest in compressed video streams. More particularly, the invention concerns a method, device, and computer program for encapsulation of scalable elementary streams containing partitioned data such as spatial tiles allowing efficient streaming of data, in particular of one or more tiles.

BACKGROUND OF THE INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits.

Recently, the Moving Picture Experts Group (MPEG) published a new standard to unify and supersede existing streaming solutions over HTTP (HyperText Transfer Protocol). This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" that represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges.

Based on a manifest, a client device determines at any time which media segments are to be downloaded from a media data server according to its needs, its capabilities (e.g. supported codecs, display size, frame rate, level of quality, etc), and depending on network conditions (e.g. available bandwidth).

In addition, video resolution is continuously increasing, going from standard definition (SD) to high definition (HD), and to ultra-high definition (e.g. 4K2K or 8K4K, that is to say video comprising images of 4,096×2,400 pixels or 7,680×4,320 pixels). However, not all receiving and video decoding devices have resources (e.g. network access bandwidth or CPU (Central Processing Unit)) to access video in full resolution, in particular when video is of ultra-high definition, and not all users need to access such video. In such a context, it is particularly advantageous to provide the ability of accessing only some Regions-of-Interest (ROIs) that is to say to access only some spatial sub-parts of a whole video sequence.

A known mechanism to access spatial sub-parts of frames belonging to a video consists in organizing each frame of the video as an arrangement of independently decodable spatial areas generally referred to as tiles. Some video formats such as SVC (Scalable Video Coding) or HEVC (High Efficiency Video Coding) provide support for tile definition. A user-defined ROI may cover one or several contiguous tiles.

Accordingly, for streaming user-selected ROIs according to HTTP protocol, it is important to provide encapsulation of timed media data of an encoded video bit-stream in a way that enables spatial access to one or more tiles and that enables combination of accessed tiles.

It is to be recalled that encoded video bit-streams are generally constructed as a set of contiguous temporal samples that correspond to complete frames, the temporal samples being organized as a function of the decoding order. File formats are used to encapsulate and describe such encoded bit-streams.

For the sake of illustration, the International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters. According to this file format, the timed media data bit-stream is contained in a data structure referred to as mdat box that is defined in another data structure referred to as track box. The track represents a timed sequence of samples where a sample corresponds to all the data associated with a single timestamp that is to say all the data associated with a single frame or all the data associated with several frames sharing the same timestamp.

For scalable video such as video of the SVC format, the layered media data organization can be efficiently represented by using multiple dependent tracks, each track representing the video at a particular level of scalability. In order to avoid data duplication between tracks, extractors can be used. According to a standard file format, an extractor is a data structure directly included in a bit-stream that enables efficient extraction of network abstraction layer (NAL) units from other bit-streams. Therefore, a bit-stream comprising data that are already included in another bit-stream is processed so as to replace these data by an extractor allowing recovering them from the other bit-stream. For instance, the bit-stream of an enhancement layer track may comprise extractors that reference NAL units from a base layer track. Then later on, when such enhancement layer track is extracted from the file format, extractors must be replaced by the data that they are referencing to.

Several strategies can be adopted when using ISO BMFF embedding these mechanisms to describe sub-information and to ease access to this sub-information or to efficiently organize bit-streams into multiple segments, in particular for the HEVC coding format and its scalable extension.

For example, in the article entitled "Implications of the ISO Base Media File Format on Adaptive HTTP Streaming of H.264/SVC", the authors, Kofler et al., present three different strategies for organizing a scalable video bit-stream (H264/SVC) for HTTP streaming considering possibilities as well as limitations of the ISO BMFF:

a) a single file containing a particular file header comprising a file type box "ftyp" and a movie box "moov" containing all ISO BMFF metadata (including track definitions), the single file also comprising a single mdat box containing the whole encoded bit-stream. This organization is suitable for local storage but is not adapted to HTTP streaming where a client may only need a part of the whole bit-stream;

b) a single file containing multiple moof/mdat boxes suitable for fragmentation. This format allows for progressive download. The moof box is equivalent to the moov box at fragment level. According to this scheme, using a fragmented media file, the scalable bit-stream is split into multiple dependent tracks representing the video at different scalability levels. Extractors are used to reference NAL units from other tracks. In case a track per tile is used, all addressable tracks have to be prepared in advance and tracks cannot be selected independently. If several tiles are to be displayed, several bit-streams must be decoded and the base layer is decoded several times;

c) multiple segments files, each file being accessible by its own URL and being downloadable independently. Each segment typically consists of a segment type box (styp), which acts as a kind of file header, an optional segment index box (sidx) and one or multiple fragments. Again, each fragment consists of a moof and a mdat box. According to this scheme, using a fragmented media file, each track is stored in its own segment with the associated bit-stream related to one level of scalability. If necessary, extractors are used to reference required bit-stream from dependent tracks. Such a coding scheme is particularly suitable for streaming tracks independently. It is well adapted to the DASH standard but it is not suitable for tile streaming since several bit-streams are to be decoded and thus, one decoder per track is required. Moreover, there is a potential duplication of the base layer's bit-stream when selecting more than one tile.

When applied to spatial tiles, none of these strategies allows efficient access to specific tiles in the context of HTTP streaming. Indeed with existing file format definition, it would still be necessary to access a multiple number of non-continuous byte ranges in an encoded bit-stream or it would result in bit-stream duplication in order to display spatial tiles of several frames corresponding to a given time interval.

U.S. Pat. No. 8,442,109 discloses a method for signaling ROI scalability information in a file format, in particular in the video compression format of the SVC type. An object of the system disclosed in this document is directed to the mapping of NAL units in regions of interest and in scalability layers in order to provide the ability of extracting ROI data from a media file. This document discloses the use of a new box referenced IroiInfoBox for signaling the geometry of a region of interest. Three different solutions are disclosed to map NAL units in regions of interest (i.e. to associate NAL units to ROI identifiers):

using tiled metadata;

using a dedicated box containing a nested loop on track's samples; and using NAL units or a specific VisualSampleGroupEntry descriptor exhaustively listing all NAL units with their assigned ROI identifier.

Regarding the mapping of NAL units in scalability layers, 'tier' boxes are used (the word 'tier' being used to describe a layer in the draft SVC file format). By doing so, ROI's geometric information is separated from identification information.

However, handling ROI's geometric information and identification information in the same structure as well as indexing tiles and ROIs (instead of indexing NAL units) is preferable from a parsing efficiency perspective and from the perspective of extracting regions of interest and tiles.

To solve these issues, there is provided an efficient data organization and track description scheme suitable for spatial tiles in scalable video streams, which ensures, whatever track combination is selected by a client application, that the result of the ISO BMFF parsing always leads to a valid video elementary bit-stream for the video decoder.

SUMMARY OF THE INVENTION

Faced with these constraints, the inventors provide a method and a device for encapsulating tiled timed media data in a server and for providing a timed media data bit-stream from tiled timed media data encapsulated in a plurality of media segment files.

It is a broad object of the invention to remedy the shortcomings of the prior art as described above.

According to a first aspect of the invention there is provided a method for encapsulating partitioned timed media data in a server, the partitioned timed media data comprising timed samples, each timed sample comprising a first layer and at least one second layer where at least one of the layers comprises a plurality of subsamples represented by one or more coding units, the method comprising:

obtaining at least one subsample from amongst the plurality of subsamples of one of the timed samples, the obtained subsamples forming a subset of the set of the subsamples of the one of the timed samples;

creating one track comprising the at least one obtained subsample; and independently encapsulating the created track in at least one media segment file, said media segment file comprising mapping metadata for providing information about the at least one obtained subsample relative to the one of the timed samples and the layer it belongs to.

Accordingly, the invention enables the combination of different scalable portions, and in particular of different scalable tiles, and the creation of a valid file format whatever the selected set of scalable portions or tiles downloaded by a client device.

Therefore, the method of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

In an embodiment, the mapping metadata are stored within the same structure.

In an embodiment, the partitioned timed media data are tiled timed media data, the subsamples being spatial subsamples.

In an embodiment, the method further comprises a step of configuring a data descriptors for storing mapping metadata including definitions of different groups of subsamples, a first group being associated with a first type of information characterizing coding units of a subsample and a second group being associated with a second type of information characterizing coding units of a subsample.

In an embodiment, the first type of information is directed to information characterizing a relation between coding units of a subsample and the corresponding timed sample and the second type of information is directed to information characterizing a relation between coding units of a subsample and the layer organization of the partitioned timed media data.

In an embodiment, a group type is associated with each coding unit of a subsample enabling each coding unit to be processed as a function of the information associated with the first group or as a function of the information associated with the second group.

In an embodiment, the method further comprises a step of configuring a data descriptor for storing mapping metadata including a definition of a group of subsamples, the mapping metadata comprising information characterizing a relation between coding units of a subsample and the corresponding timed sample.

In an embodiment, the definition further comprises information characterizing a relation between at least one coding unit of a subsample and the layer organization of the partitioned timed media data.

In an embodiment, the information characterizing a relation between at least one coding unit of a subsample and the layer organization of the partitioned timed media data comprises layer dependency information of subsamples.

In an embodiment, the layer dependency information of subsamples comprises a link to a subsample definition.

In an embodiment, the information characterizing a relation between at least one coding unit of a subsample and the layer organization of the partitioned timed media data comprises a link to a layer description of the layer organization of the partitioned timed media data.

In an embodiment, the data descriptor is used by default for characterizing coding units of subsamples, the method further comprising a step of configuring at least one further data descriptor for storing mapping metadata comprising subsample identifiers and corresponding information characterizing a relation between coding units of the identified subsamples and the corresponding timed sample.

In an embodiment, the mapping metadata of the at least one further data descriptor for storing mapping metadata further comprises information characterizing a relation between at least one coding unit of the identified subsamples and the layer organization of the partitioned timed media data.

In an embodiment, the server is compatible with the HyperText Transfer Protocol (HTTP).

In an embodiment, the media segment file resulting from encapsulating the created track is compatible with the Base Media File Format and the Dynamic Adaptive Streaming over HTTP format as defined by the International Standard Organization.

According to a second aspect of the invention there is provided a method for providing a timed media data bitstream from partitioned timed media data encapsulated in a media segment file, in a client device, the partitioned timed media data comprising timed samples, each timed sample comprising a first layer and at least one second layer where at least one of the layers comprises a plurality of subsamples represented by one or more coding units, the media segment file comprising a track comprising at least one subsample selected from amongst the plurality of subsamples of one of the timed samples, the at least one subsample forming a subset of the set of the subsamples of the one of the timed samples, the method comprising:

selecting an item of information representative of at least one subsample;

requesting the track comprising the at least one subsample represented by the selected item of information;

receiving the media segment file, the received media segment file comprising mapping metadata for providing information about the at least one subsample represented by the selected item of information relative to the corresponding sample and the layer it belongs to; and recovering the at least one subsample represented by the selected item of information from the received media segment file as a function of the mapping metadata.

Accordingly, the invention enables the combination of different scalable portions, and in particular of different scalable tiles, and the creation of a valid file format whatever the selected set of scalable portions or tiles downloaded by a client device.

Therefore, the method of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

In an embodiment, the mapping metadata are stored within the same structure.

In an embodiment, the partitioned timed media data are tiled timed media data, the subsamples being spatial subsamples.

In an embodiment, the method further comprises a step of obtaining from the received media segment file data descriptors storing mapping metadata including definitions of different groups of subsamples, a first group being associated with a first type of information characterizing coding units of a subsample and a second group being associated with a second type of information characterizing coding units of a subsample.

In an embodiment, the first type of information is directed to information characterizing a relation between coding units of a subsample and the corresponding timed sample and the second type of information is directed to information characterizing a relation between coding units of a subsample and the layer organization of the partitioned timed media data.

In an embodiment, the method further comprises a step of determining a group type for each coding unit of a received subsample and a step of processing each of the coding units as a function of the information associated with the first group or as a function of the information associated with the second group.

In an embodiment, the method further comprises a step of obtaining from the received media segment file a data descriptor storing mapping metadata including a definition of a group of subsamples, the mapping metadata comprising information characterizing a relation between coding units of a received subsample and the corresponding timed sample.

In an embodiment, the definition further comprises information characterizing a relation between at least one coding unit of a received subsample and the layer organization of the partitioned timed media data, the method further comprising a step of processing a coding unit of a received subsample as a function of the information characterizing the relation between the coding unit and the layer organization of the partitioned timed media data.

In an embodiment, the method further comprises a step of processing the coding unit of the received subsample as a function of a layer dependency information of subsamples.

In an embodiment, the method further comprises a step of obtaining a subsample definition of a subsample to which depends the processed coding unit.

In an embodiment, the information characterizing a relation between at least one coding unit of a received subsample and the layer organization of the partitioned timed media data comprises a link to a layer description of the layer organization of the partitioned timed media data, the method further comprising a step of processing a coding unit of a received subsample as a function of the link to the layer description of the layer organization of the partitioned timed media data.

In an embodiment, the data descriptor is used by default for characterizing coding units of received subsamples, the method further comprising a step of obtaining at least one further data descriptor storing mapping metadata comprising subsample identifiers and corresponding information characterizing a relation between coding units of the identified subsamples and the corresponding timed sample, the method further comprising a step of determining whether or not a subsample to be processed is identified within the further data descriptor.

In an embodiment, the mapping metadata of the at least one further data descriptor storing mapping metadata further comprises information characterizing a relation between at least one coding unit of the identified subsamples and the layer organization of the partitioned timed media data, the method further comprising a step of processing a received subsample as a function of the information characterizing a relation between at least one coding unit of the identified subsamples and the layer organization of the partitioned timed media data.

In an embodiment, the client device is compatible with the HyperText Transfer Protocol (HTTP).

In an embodiment, the received media segment files are compatible with the Base Media File Format and the Dynamic Adaptive Streaming over HTTP format as defined by the International Standard Organization.

According to a third aspect of the invention there is provided a method for encapsulating partitioned timed media data in a server, the partitioned timed media data comprising timed samples which comprises a plurality of subsamples represented by one or more coding units, the method comprising:
  obtaining at least one subsample from amongst the plurality of subsamples of one of the timed samples, the obtained subsamples forming a subset of the set of the subsamples of the one of the timed samples;
  creating one track per obtained subsample; and
  encapsulating the created tracks in at least one media segment file, said media segment file comprising:
    metadata for signaling that the created tracks comprise subsamples which are part of the same timed sample, and
    media data organized into chunks, each chunk comprising the coding units of the same subsample for the considered timed samples.

Accordingly, the invention enables the combination of different scalable portions, and in particular of different scalable tiles, and the creation of a valid file format whatever the selected set of scalable portions or tiles downloaded by a client device.

Therefore, the method of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

According to a fourth aspect of the invention there is provided a method for providing a timed media data bitstream from partitioned timed media data encapsulated in a media segment file, in a client device, the partitioned timed media data comprising timed samples, each timed sample comprising a first layer and at least one second layer where at least one of the layers comprises a plurality of subsamples represented by one or more coding units, the media segment file comprising a plurality of tracks, each track comprising one subsample selected from amongst the plurality of subsamples of one of the timed samples, the subsamples of the tracks forming a subset of the set of the subsamples of the one of the timed samples, the method comprising:
  selecting an item of information representative of at least one subsample;
  requesting the tracks comprising the subsamples represented by the selected item of information;
  receiving the media segment file, the received media segment file comprising
    metadata for signaling that the received tracks comprise subsamples which are part of the same timed sample, and
    media data organized into chunks, each chunk comprising the coding units of the same subsample for the considered timed samples,
  recovering the subsamples represented by the selected item of information from the received media segment file as a function of the mapping metadata.

Accordingly, the invention enables the combination of different scalable portions, and in particular of different scalable tiles, and the creation of a valid file format whatever the selected set of scalable portions or tiles downloaded by a client device.

Therefore, the method of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

According to a fifth aspect of the invention there is provided a device for encapsulating partitioned timed media data in a server, the partitioned timed media data comprising timed samples, each timed sample comprising a first layer and at least one second layer where at least one of the layers comprises a plurality of subsamples represented by one or more coding units, the device comprising at least one microprocessor configured for carrying out the steps of:

obtaining at least one subsample from amongst the plurality of subsamples of one of the timed samples, the obtained subsamples forming a subset of the set of the subsamples of the one of the timed samples;

creating one track comprising the at least one obtained subsample; and independently encapsulating the created track in at least one media segment file, said media segment file comprising mapping metadata for providing information about the at least one obtained subsample relative to the one of the timed samples and the layer it belongs to.

Accordingly, the invention enables the combination of different scalable portions, and in particular of different scalable tiles, and the creation of a valid file format whatever the selected set of scalable portions or tiles downloaded by a client device.

Therefore, the device of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

In an embodiment, the mapping metadata are stored within the same structure.

In an embodiment, the partitioned timed media data are tiled timed media data, the subsamples being spatial subsamples.

In an embodiment, the microprocessor is further configured for carrying out the step of configuring a data descriptors for storing mapping metadata including definitions of different groups of subsamples, a first group being associated with a first type of information characterizing coding units of a subsample and a second group being associated with a second type of information characterizing coding units of a subsample.

In an embodiment, the first type of information is directed to information characterizing a relation between coding units of a subsample and the corresponding timed sample and the second type of information is directed to information characterizing a relation between coding units of a subsample and the layer organization of the partitioned timed media data.

In an embodiment, a group type is associated with each coding unit of a subsample enabling each coding unit to be processed as a function of the information associated with the first group or as a function of the information associated with the second group.

In an embodiment, the microprocessor is further configured for carrying out the step of configuring a data descriptor for storing mapping metadata including a definition of a group of subsamples, the mapping metadata comprising information characterizing a relation between coding units of a subsample and the corresponding timed sample.

In an embodiment, the definition further comprises information characterizing a relation between at least one coding unit of a subsample and the layer organization of the partitioned timed media data.

In an embodiment, the information characterizing a relation between at least one coding unit of a subsample and the layer organization of the partitioned timed media data comprises layer dependency information of subsamples.

In an embodiment, the layer dependency information of subsamples comprises a link to a subsample definition.

In an embodiment, the information characterizing a relation between at least one coding unit of a subsample and the layer organization of the partitioned timed media data comprises a link to a layer description of the layer organization of the partitioned timed media data.

In an embodiment, the data descriptor is used by default for characterizing coding units of subsamples, the microprocessor being further configured for carrying out the step of configuring at least one further data descriptor for storing mapping metadata comprising subsample identifiers and corresponding information characterizing a relation between coding units of the identified subsamples and the corresponding timed sample.

In an embodiment, the mapping metadata of the at least one further data descriptor for storing mapping metadata further comprises information characterizing a relation between at least one coding unit of the identified subsamples and the layer organization of the partitioned timed media data.

According to a sixth aspect of the invention there is provided a device for providing a timed media data bitstream from partitioned timed media data encapsulated in a media segment file, in a client device, the partitioned timed media data comprising timed samples, each timed sample comprising a first layer and at least one second layer where at least one of the layers comprises a plurality of subsamples represented by one or more coding units, the media segment file comprising a track comprising at least one subsample selected from amongst the plurality of subsamples of one of the timed samples, the at least one subsample forming a subset of the set of the subsamples of the one of the timed samples, the device comprising at least one microprocessor configured for carrying out the steps of:

selecting an item of information representative of at least one subsample;

requesting the track comprising the at least one subsample represented by the selected item of information;

receiving the media segment file, the received media segment file comprising mapping metadata for providing information about the at least one subsample represented by the selected item of information relative to the corresponding sample and the layer it belongs to; and recovering the at least one subsample represented by the selected item of information from the received media segment file as a function of the mapping metadata.

Accordingly, the invention enables the combination of different scalable portions, and in particular of different scalable tiles, and the creation of a valid file format whatever the selected set of scalable portions or tiles downloaded by a client device.

Therefore, the device of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

In an embodiment, the mapping metadata are stored within the same structure.

In an embodiment, the partitioned timed media data are tiled timed media data, the subsamples being spatial subsamples.

In an embodiment, the microprocessor is further configured for carrying out the step of obtaining from the received media segment file data descriptors storing mapping metadata including definitions of different groups of subsamples, a first group being associated with a first type of information characterizing coding units of a subsample and a second group being associated with a second type of information characterizing coding units of a subsample.

In an embodiment, the first type of information is directed to information characterizing a relation between coding units of a subsample and the corresponding timed sample and the second type of information is directed to information characterizing a relation between coding units of a subsample and the layer organization of the partitioned timed media data.

In an embodiment, the microprocessor is further configured for carrying out the step of determining a group type for each coding unit of a received subsample and a step of processing each of the coding units as a function of the information associated with the first group or as a function of the information associated with the second group.

In an embodiment, the microprocessor is further configured for carrying out the step of obtaining from the received media segment file a data descriptor storing mapping metadata including a definition of a group of subsamples, the mapping metadata comprising information characterizing a relation between coding units of a received subsample and the corresponding timed sample.

In an embodiment, the definition further comprises information characterizing a relation between at least one coding unit of a received subsample and the layer organization of the partitioned timed media data, the microprocessor being further configured for carrying out the step of processing a coding unit of a received subsample as a function of the information characterizing the relation between the coding unit and the layer organization of the partitioned timed media data.

In an embodiment, the microprocessor is further configured for carrying out the step of processing the coding unit of the received subsample as a function of a layer dependency information of subsamples.

In an embodiment, the microprocessor is further configured for carrying out the step of obtaining a subsample definition of a subsample to which depends the processed coding unit.

In an embodiment, the information characterizing a relation between at least one coding unit of a received subsample and the layer organization of the partitioned timed media data comprises a link to a layer description of the layer organization of the partitioned timed media data, the microprocessor being further configured for carrying out the step of processing a coding unit of a received subsample as a function of the link to the layer description of the layer organization of the partitioned timed media data.

In an embodiment, the data descriptor is used by default for characterizing coding units of received subsamples, the microprocessor being further configured for carrying out the step of obtaining at least one further data descriptor storing mapping metadata comprising subsample identifiers and corresponding information characterizing a relation between coding units of the identified subsamples and the corresponding timed sample, and the microprocessor being further configured for carrying out the step of determining whether or not a subsample to be processed is identified within the further data descriptor.

In an embodiment, the mapping metadata of the at least one further data descriptor storing mapping metadata further comprises information characterizing a relation between at least one coding unit of the identified subsamples and the layer organization of the partitioned timed media data, the microprocessor being further configured for carrying out the step of processing a received subsample as a function of the information characterizing a relation between at least one coding unit of the identified subsamples and the layer organization of the partitioned timed media data.

According to a seventh aspect of the invention there is provided a device for encapsulating partitioned timed media data in a server, the partitioned timed media data comprising timed samples which comprises a plurality of subsamples represented by one or more coding units, the device comprising at least one microprocessor configured for carrying out the steps of:
- obtaining at least one subsample from amongst the plurality of subsamples of one of the timed samples, the obtained subsamples forming a subset of the set of the subsamples of the one of the timed samples;
- creating one track per obtained subsample; and
- encapsulating the created tracks in at least one media segment file, said media segment file comprising:
  - metadata for signaling that the created tracks comprise subsamples which are part of the same timed sample, and
  - media data organized into chunks, each chunk comprising the coding units of the same subsample for the considered timed samples.

Accordingly, the invention enables the combination of different scalable portions, and in particular of different scalable tiles, and the creation of a valid file format whatever the selected set of scalable portions or tiles downloaded by a client device.

Therefore, the device of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

According to an eighth aspect of the invention there is provided a device for providing a timed media data bitstream from partitioned timed media data encapsulated in a media segment file, in a client device, the partitioned timed media data comprising timed samples, each timed sample comprising a first layer and at least one second layer where at least one of the layers comprises a plurality of subsamples represented by one or more coding units, the media segment file comprising a plurality of tracks, each track comprising one subsample selected from amongst the plurality of subsamples of one of the timed samples, the subsamples of the tracks forming a subset of the set of the subsamples of the one of the timed samples, the device comprising at least one microprocessor configured for carrying out the steps of:

selecting an item of information representative of at least one subsample;

requesting the tracks comprising the subsamples represented by the selected item of information;

receiving the media segment file, the received media segment file comprising metadata for signaling that the received tracks comprise subsamples which are part of the same timed sample, and media data organized into chunks, each chunk comprising the coding units of the same subsample for the considered timed samples, recovering the subsamples represented by the selected item of information from the received media segment file as a function of the mapping metadata.

Accordingly, the invention enables the combination of different scalable portions, and in particular of different scalable tiles, and the creation of a valid file format whatever the selected set of scalable portions or tiles downloaded by a client device.

Therefore, the device of the invention is suitable for efficient streaming of independent scalable portions or tiles, requires only useful data to be sent to a client device, is suitable for more than one portion or tile selection (i.e. arbitrary ROI), reduces indexation overhead, and can be integrated in a MPEG standard.

Moreover, handling ROI's geometric information and identification information in the same structure as well as indexing tiles and ROIs improves parsing efficiency and extraction of regions of interest and tiles.

In an embodiment, the server is compatible with the HyperText Transfer Protocol (HTTP) and wherein the received media segment files are compatible with the Base Media File Format and the Dynamic Adaptive Streaming over HTTP format as defined by the International Standard Organization.

In an embodiment, the client device is compatible with the HyperText Transfer Protocol (HTTP) and wherein the received media segment files are compatible with the Base Media File Format and the Dynamic Adaptive Streaming over HTTP format as defined by the International Standard Organization.

According to a ninth and a tenth aspects of the invention there is provided a video encoder and a video decoder comprising the device described above.

Accordingly, the invention enables the combination of different scalable portions, and in particular of different scalable tiles, and the creation of a valid file format whatever the selected set of scalable portions or tiles downloaded by a client device.

Therefore, the video encoder and the video decoder of the invention are suitable for efficient streaming of independent scalable portions or tiles, require only useful data to be sent to a client device, are suitable for more than one portion or tile selection (i.e. arbitrary ROI), reduce indexation overhead, and can be integrated in a MPEG standard.

Moreover, handling ROI's geometric information and identification information in the same structure as well as indexing tiles and ROIs improves parsing efficiency and extraction of regions of interest and tiles.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIGS. 1a and 1b, illustrate an example of coding tiles in an encoded video bit-stream;

FIGS. 3a, 3b, and 3c, illustrate different examples of configurations of HEVC scalable bit-streams;

FIGS. 6a and 6b, illustrate an example of encapsulating a tiled scalable video stream of the HEVC type as a single track into an mp4 file, according to a first embodiment;

FIG. 8 illustrates an example of new parameters of the TileRegionGroupEntry descriptor allowing encapsulating a tiled scalable video stream of the HEVC type into a file such as an mp4 file;

FIGS. 9a and 9b, illustrate an example of encapsulating a tiled scalable video stream of the HEVC type as a single track into an mp4 file, according to a third embodiment;

FIG. 10 illustrates tile and scalable layer descriptors, according to a particular embodiment, to encapsulate an HEVC bit-stream;

FIG. 11a and FIG. 11b, is a flow chart illustrating steps for transmitting timed media data between a server and a client device according to a particular embodiment;

FIG. 14a and FIG. 14b, illustrate signalization of the position of a tile in a full video, the size of the tile, and of the indication that the tile track can be decoded without any artifact, at sub-sample level, adapted to handle various tiling configuration; and FIGS. 15a and 15b, illustrate an example of encapsulating tiles in multiple tracks, for efficient data addressing.

DETAILED DESCRIPTION OF EMBODIMENTS OF THE INVENTION

Figure 2:
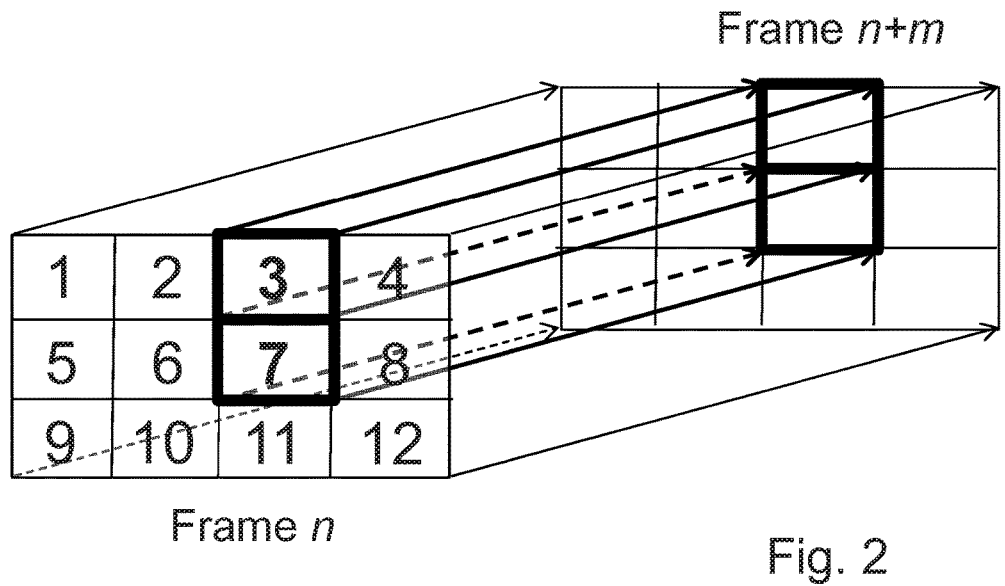
FIG. 2 illustrates a temporal pipe of tiles selected by a user to be displayed.

According to a particular embodiment, scalable partitioned timed media data such as tiled timed media data (e.g. video data) comprising timed samples (e.g. images) are transmitted as a set of media segment files, for example media segment files conforming to the mp4 (ISO/IEC 14496-14) standard. The media segment files are typically made up of a header part and a data part. The header part contains descriptive metadata to address and extract data contained in the data part. The timed samples contain one or more representation layers (scalable video) with spatial subsamples (tiles). Each spatial subsample can be represented by one or several NAL units.

An initialization segment file can be used to transmit metadata required to decode media segment files.

FIG. 1, comprising FIG. 1a and FIG. 1b, illustrates an example of coding tiles in an encoded video bit-stream.

For the sake of illustration, it is considered in the following description that each video frame (timed sample) is composed of independently decodable tiles corresponding to spatial sub-parts (spatial subsamples) of the video frame. The video is preferably scalable and organized in different levels of scalability. As illustrated in FIG. 1a, a video frame 100 may comprise an HD base layer (102) and a 4K2K enhancement layer (104). Still for the sake of illustration, enhancement layer 104 can be divided into four regular tiles denoted a, b, c, and d. It is to be noted that tiles of different shapes may be handled. Likewise, base layer 102 can be divided into several tiles.

FIG. 1b represents a typical encoded video bit-stream in a decoding order. As illustrated, the encoded video bit-stream comprises here three video frames (110, 112, and 114) encoded in a temporal order. Each video frame comprises all the network abstraction layer (NAL) units of the base layer (BL) followed by the NAL units of the enhancement layer. For example, the NAL units (1BL, 116) of the base layer (102-1) of the first video frame (110) are followed by the NAL units (1 common, 1a, 1b, 1c, 1d, 118) of the enhancement layer (104-1) of the first video frame.

The part of the video bit-stream corresponding to an enhancement layer with spatial tiles is composed of NAL units of each tile. Optionally, it may also contain NAL units that are common to all tiles and that are required to decode any of the tiles. The NAL units that are common to all tiles of a given frame can be located anywhere in the corresponding part of the video bit-stream (i.e. before, between, or after the NAL units of the tiles of the video frame).

As illustrated, the part of the video bit-stream corresponding to the enhancement layer of the first video frame (110), comprising spatial tiles a, b, c, and d, is composed of NAL units for each tile (1a, 1b, 1c, and 1d) and of NAL units (1 common) that are common to all tiles a, b, c, and d.

FIG. 2 illustrates a temporal pipe of tiles selected by a user to be displayed. More precisely, FIG. 2 represents a first video frame n and a second video frame n+m (where n and m are integer values), each of the first and second video frames comprising twelve tiles numbered 1 to 12. Amongst these twelve tiles, only the third and seventh ones are to be displayed (as denoted with bold lines). Video frames n and n+m belong to a series of consecutive frames corresponding to a given temporal period. Therefore, the third and seventh tiles of each frame from frame n to frame n+m are displayed consecutively.

As illustrated in FIG. 1, the data of a video bit-stream are organized as temporal samples that correspond to full frames. Accordingly, it is required to access several small byte ranges for each frame when particular spatial areas of these frames are to be accessed during a given period of time as described above by reference to FIG. 2.

Therefore, to provide an efficient access in compressed videos for ROI streaming, i.e. to provide an efficient access to data of particular tiles and of particular scalability layers, the timed media data bit-stream is to be efficiently described.

FIG. 3, comprising FIGS. 3a, 3b, and 3c, illustrates different examples of configurations of HEVC scalable bit-streams.

FIG. 3a is an example of a spatially scalable video bit-stream comprising a base layer 300 and an enhancement bit-stream comprising a base layer 300 and an enhancement layer 305. Enhancement layer 310 is encoded as a function of base layer 300. In such a video bit-stream format, there exists a picture to picture dependency since not any of the base and enhancement layers contains tile.

FIG. 3b illustrates another example of a scalable video bit-stream comprising a base layer 310 and an enhancement layer 315. According to this example, enhancement layer 315 is a tiled enhancement layer comprising, in particular, tile 320. In such a video bit-stream format, there exists a tile to picture dependency since tiles of the enhancement layer depend on the base layer.

FIG. 3c still illustrates another example of a scalable video bit-stream comprising a base layer 325 and an enhancement layer 330. According to this example, base layer 325 is a tiled base layer comprising, in particular, tiles 335 and 340, and enhancement layer 330 is a tiled enhancement layer comprising, in particular, tile 345 and tile set 350. Base layer 325 can be spatially enhanced with enhancement layer 330. In such a video bit-stream format, there exists a tile to tile dependency since tiles of the enhancement layer depend on tiles of the base layer. There also exists a tile set to tile dependency since a tile set of the enhancement layer depends on tiles of the base layer. For the sake of illustration, tile 345 depends on tile 340 and tile set 350 depends on tile 335. Other dependencies may exist such as a tile to tile set dependency or a tile set to tile set dependency.

It is to be noted that similar configurations exist for a SNR scalable layer that could be tiled or not on top of a base layer that also could be tiled or not.

Figure 4:
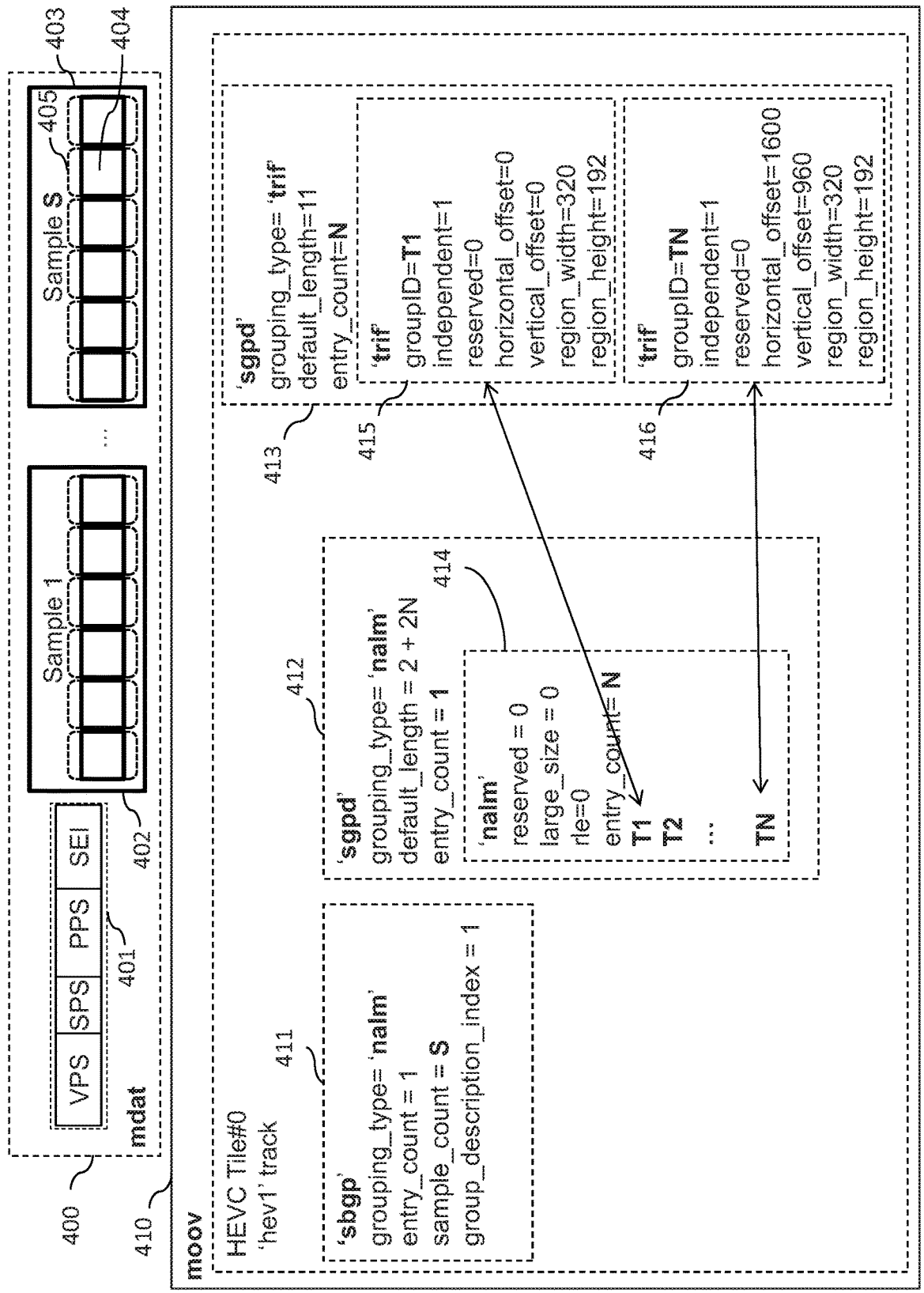
FIG. 4 illustrates an example of a tiled video bit-stream conforming to the HEVC standard, encoded as a single mp4 track.

FIG. 4 illustrates an example of a tiled video bit-stream conforming to the HEVC standard, encoded as a single mp4 track comprising a first part 400 for encoding data and a second part 410 comprising descriptive metadata.

Video data are encoded within mdat box 400 that comprises parameter set 401 and sample data, for example sample data 402 and 403 corresponding to sample 1 and sample S, respectively. As illustrated, the parameter set typically comprises VPS (Video Parameter Set), SPS (Sequence Parameter Set), PPS (Picture Parameter Set), and SEI (Supplemental Enhancement Information). Each sample contains NAL units such as sample S that comprises NAL unit 404. According to the particular configuration illustrated in FIG. 4, each tile is encoded within one NAL unit. For example, NAL unit 404 contains tile 405.

As represented, the descriptive metadata are contained within moov box 410. It mainly comprises sample grouping information. In particular, it comprises a SampleToGroup box ('sbgp') 411 that describes the assignment of samples to sample groups and two SampleGroupDescription boxes ('sgpd') 412 and 413 that each describes a certain type of common properties of samples within a particular sample group. The first SampleToGroupDescription box 412 describes the mapping of the NAL units into groups (identified with groupID identifiers) defining tile descriptions. These tile descriptions are described in the second SampleGroupDescription box 413.

As illustrated in the given example, each NAL unit declared in the NALUMapEntrybox 414 points to a TileRegionGroupEntrybox (identified by the 'trif' (Tile Region Information) flag) such as TileRegionGroupEntry boxes 415 and 416. Each TileRegionGroupEntry box provides tile information such as a decoding indication to indicate whether or not tile data are independently decodable and to indicate tile position and tile size.

Figure 5:
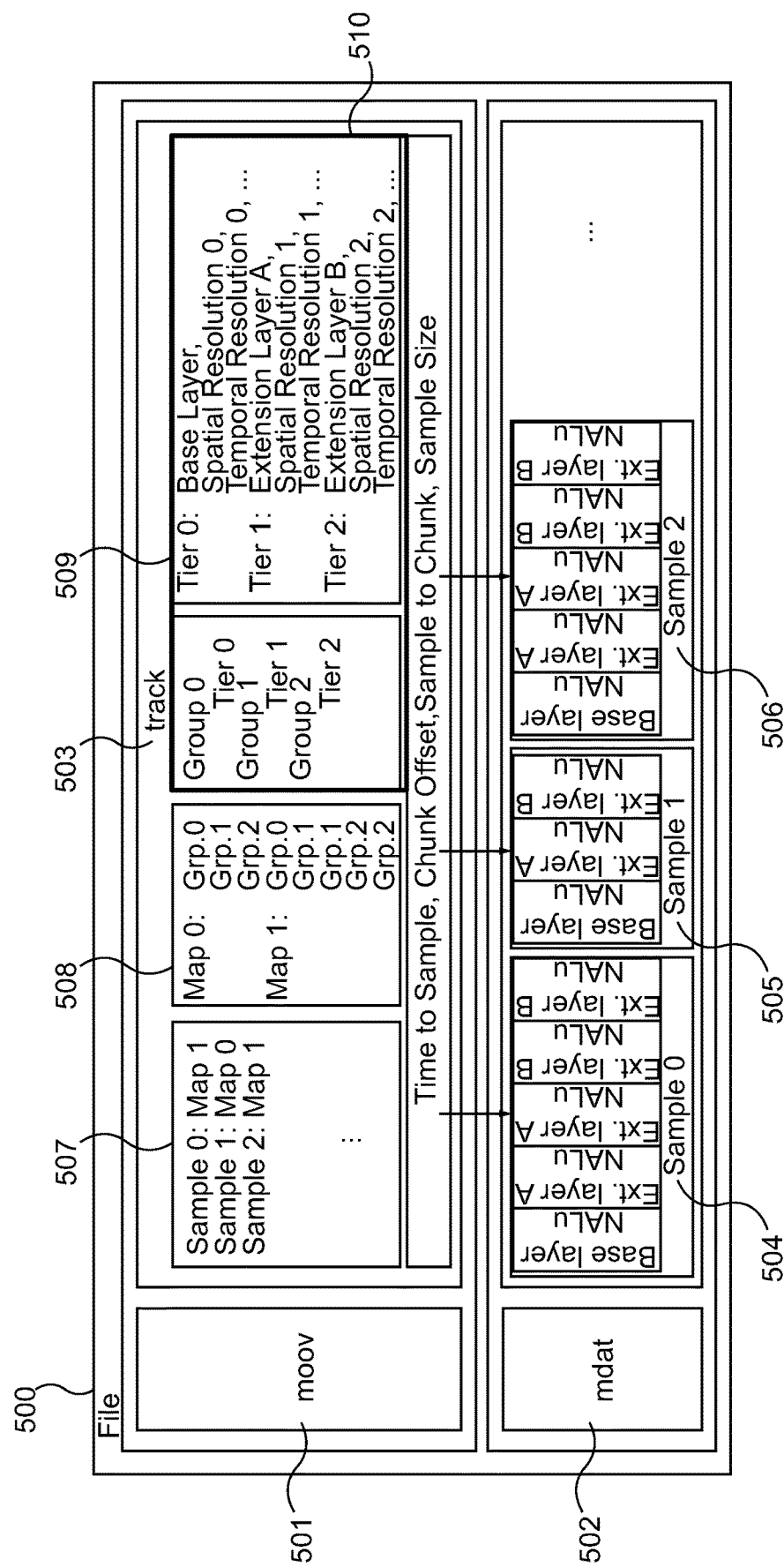
FIG. 5 illustrates an example of a sample-based encapsulation SVC stream, conforming to ISO/IEC 14496-15, encoded in an mp4 file.

FIG. 5 illustrates an example of a sample-based encapsulation SVC stream, conforming to ISO/IEC 14496-15, encoded in an mp4 file 500.

As represented, descriptive metadata are contained within moov box 501 and video data are encoded within mdat box 502.

Moov box 501 encapsulates a single track 503 that mainly describes how video data samples, for example video data samples 504, 505 and, 506 map to descriptions. To that end, SampleToGroup box 507, referencing SampleToGroupDescription boxes 508 and 509, is used. More precisely, SampleToGroup box 507 assigns a map identifier to each sample, depending on its NAL unit mapping into scalability layers. As illustrated, each sample can be assigned, in the given example, to Map 0 or Map 1 identifier. Each NAL unit mapping is described in a ScalableNALUMapEntry descriptor that is stored in SampleToGroupDescription box 508. In each ScalableNALUMapEntrydescriptor, a groupID parameter indicates in which ScalableGroupEntry box of SampleGroupDescription box 510 the description can be found. In other words, the groupID parameter indicates the corresponding scalable, multiview, tile, tile set, or HEVC layer group entry, as indicated in the sample group descriptions. If the value of this parameter is zero, no group is associated to these identified NAL units.

Descriptions of scalability layers can be declared in 'Tiers' that are used to describe layers according to a specific notion introduced for SVC encapsulation. More precisely, a 'Tier' describes a set of operating points within a track, providing information about the operating points and instructions on how to access the corresponding bit-stream portions. According to SVC standard, an operation point is represented by a triplet comprising the three following identifiers: dependency_id, temporal_id, and quality_id. A 'Tier' is represented by one or several boxes stored within a ScalableGroupEntry box such as ScalableGroupEntry box 509. One box, referenced TierInfoBox, is mandatory in 'Tier' description to provide profile and level information as encoded in a video elementary stream and in spatial and temporal resolution streams, as illustrated in ScalableGroupEntry box 509.

FIG. 6, comprising FIGS. 6a and 6b, illustrates an example of encapsulating a tiled scalable video stream of the HEVC type as a single track into an mp4 file, according to a first embodiment.

As illustrated in FIG. 6a, it is assumed that the video stream comprises a base layer 600 that can be enhanced by the two independent spatial enhancement layers 601 and 602. Enhancement layer 601, referenced enhancement layer A, comprises tiles T1 and T2, and enhancement layer 602, referenced enhancement layer B, comprises tiles T1, T2, T3, and T4 (tile T1 and T2 of enhancement layer A being different from tiles T1 and T2 of enhancement layer B).

Turning to FIG. 6b, in order to encapsulate the tiled scalable video stream encoded according to the HEVC standard into mp4 file 610, video data are stored in mdat box 612 as a list of samples comprising, in particular, sample 620. Each sample is encoded as a set of one or more NAL units. As illustrated, sample 620 comprises interlaced NAL units 621 to 627 corresponding to the base layer (NAL unit 621), the tiled enhancement layer A (NAL units 622 and 623), and the tiled enhancement layer B (NAL units 624 to 627).

A description of these data is stored in a moov box 611 containing a 'trak' box for describing, in particular, NAL unit mapping and sample grouping. According to the given example, it is needed to describe the NAL unit mapping into tiles, as described by reference to FIG. 4, and the NAL unit mapping into the scalability layers as described by reference to FIG. 5.

Combining the solutions disclosed by reference to FIGS. 4 and 5 leads to the use of two SampleToGroup boxes 613 and 614 for mapping each video data sample as a function of a map for mapping NAL units into tiles (NALUMapEntry box 615) and as a function of a map for mapping NAL units into scalability layers (NALUMapEntry box 615). Tile relationships can be described within the TileRegionGroupEntry structure in a dedicated SampleGroupDescription box (not represented in FIG. 6) while scalable layer relationships can be described using boxes equivalent to 'Tier' boxes.

However, since 'Tiers' are not defined in the HEVC standard, an equivalent structure should be used to store information relative to the layer organization. This can be done by using an HEVCLayerDefinitionBox box for each layer as illustrated in FIG. 6b where HEVCLayerDefinitionBox boxes 617, 618, and 619 give information on the base layer, the enhancement layer A, and the enhancement layer B, respectively. An example of the structure of HEVCLayerDefinitionBox box is described by reference to FIG. 8 (reference 802).

To avoid any conflict between the groupID identifiers used in the tile description and the groupID identifiers used in the scalability layers, the relationship between NAL units associated with tiles and NAL units associated with scalability layers is to be established. To that end, the NALUMapEntry structure is extended with a new parameter that may be referenced ref_grouping_type:

```
class NALUMapEntry( ) extends VisualSampleGroupEntry ('nalm') {
    unsigned int(32)ref_grouping_type;
    unsigned int(6) reserved = 0;
    unsigned int(1) large_size;
    unsigned int(1) mode;
    if (large_size) unsigned int(16) entry_count;
    else            unsigned int(8) entry_count;
    for (i=1; i<= entry_count; i++) {
        if (mode) {
            if (large_size) unsigned int(16) NALU_start_number;
            else            unsigned int(8) NALU_start_number;
        }
        unsigned int(32) groupID;
    }
}
```

According to the example illustrated in FIG. 6, the value of the ref_grouping_type parameter can be set to 'trif' for selecting a NALUMapEntrydescriptor that is specific to tile, referenced map 615 (pointing to a tile description), and to 'scif' (Scalable Group Entry providing scalability information) for selecting another NALUMapEntry descriptor that is specific to scalability, referenced map 616 (pointing to a scalability layer description).

'trif' is described above by reference to FIG. 4, in a 'sgpd' box. For the sake of clarity, this box is not illustrated in FIG. 6b. However, as illustrated in FIG. 4, an 'sgpd' box can be included in a 'moov' box.

'scif' is another well-known box which provides information (not illustrated here to simplify the figure) about scalability as the identifier of the operating point ('tier') or reference to 'tier' boxes.

This provides useful indication to mp4 parser for the resolution of groupID identifiers that are put at the end of the NALU map entries (since information corresponding to a groupID can be in any SampleGroupDescription box). Knowing the ref_grouping_type information allows the parser to explore only one SampleGroupDescription box for obtaining information that relates to a particular groupID (the explored SampleGroupDescription box is the one corresponding to the value of the ref_grouping_type).

As mentioned above, handling tile and ROI's geometric information and identification information (position, dependencies, layers and the like) in the same structure (NALUMapEntry descriptor) as well as indexing tiles and ROIs (instead of indexing NAL units) is preferable from a parsing efficiency perspective and from the perspective of extracting regions of interest and tiles more rapidly.

Figure 7A:
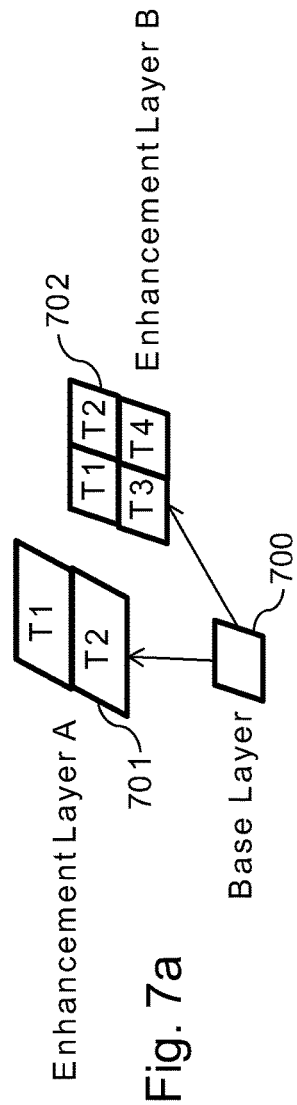
FIGS. 7a and 7b, illustrate an example of encapsulating a tiled scalable video stream of the HEVC type as a single track into an mp4 file, according to a second embodiment.
Figure 7B:
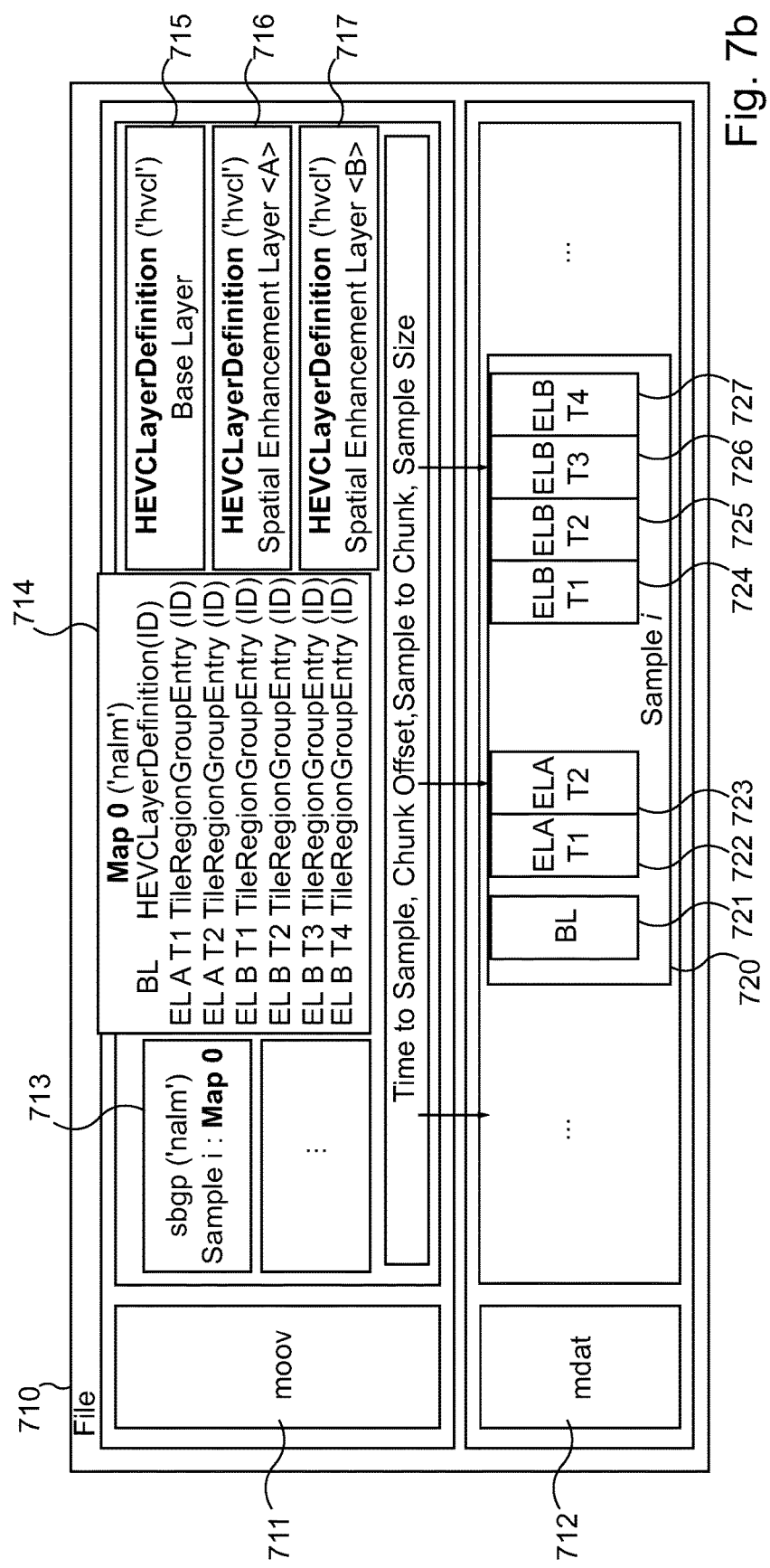

FIG. 7, comprising FIGS. 7a and 7b, illustrates an example of encapsulating a tiled scalable video stream of the HEVC type as a single track into an mp4 file, according to a second embodiment allowing reducing the amount of duplicated information.

As illustrated in FIG. 7a, that is similar to FIG. 6a, it is assumed that the video stream comprises a base layer 700 that can be enhanced by the two independent spatial enhancement layers 701 and 702. Enhancement layer 701, referenced enhancement layer A, comprises tiles T1 and T2, and enhancement layer 702, referenced enhancement layer B, comprises tiles T1, T2, T3, and T4 (tile T1 and T2 of enhancement layer A being different from tiles T1 and T2 of enhancement layer B).

Again, turning to FIG. 7b, in order to encapsulate the tiled scalable video stream encoded according to the HEVC standard into mp4 file 710, video data are stored in mdat box 712 as a list of samples comprising, in particular, sample 720. Each sample is encoded as a set of one or more NAL units. As illustrated, sample 720 comprises interlaced NAL units 721 to 727 corresponding to the base layer (NAL unit 721), the tiled enhancement layer A (NAL units 722 and 723), and the tiled enhancement layer B (NAL units 724 to 727).

However, contrarily to the encapsulation scheme described by reference to FIG. 6 where several NALUMapEntry boxes are used, the encapsulation scheme is based, here, on a single NAL unit mapping described in a NALUMapEntry box 714. NALUMapEntry box 714 is referenced from SampleToGroup box 713 that has one single entry since the number of NAL units per sample is considered as constant from one sample to another. Therefore, all the samples of the track are mapped as a function of the content of NALUMapEntry box 714.

It is to be noted that using a groupID identifier for referencing the NAL units allows the latter to be mapped either as a function of a tile description or as a function of a scalability layer description. When a scalability layer contains tiles, NAL units are first mapped as a function of a tile description and next, as a function of a scalability layer description, the tile information indicating which layer it comes from as described by reference to FIG. 8.

It is also to be noted that the encapsulation according to the embodiment described by reference to FIG. 7 is more compact than the one described by reference to FIG. 6 in that single NAL unit mapping is required.

FIG. 8 illustrates an example of new parameters of the TileRegionGroupEntry descriptor allowing encapsulating a tiled scalable video stream of the HEVC type into a file such as an mp4 file.

As illustrated, TileRegionGroupEntry descriptors 800 and 801 comprise, in the given example, dependentGroupID parameter 803 and layerGroupID parameter 804 for accessing scalability information and tile or picture dependency information. According to the given example, scalability information is stored within HEVCLayerDefinitionBox descriptor 802 and tile or picture dependency information is stored within TileRegionGroupEntry descriptor 801.

HEVCLayerDefinitionBox descriptor 802 illustrates an example of the parameters of a HEVCLayerDefinitionBox descriptor (or HEVCLayerDefinitionBox box) comprising an identifier, a dependency signaling mechanism and additional properties coming from the video elementary bi-stream. For the sake of illustration, the additional properties comprise visualWidth and visualHeight parameters. However, the additional properties mays also comprise other parameters such as a frame rate, a bit rate and profile and level information. They may also comprise high level syntax information describing a scalability layer.

The new and modified parameters of the modified TileRegionGroupEntry descriptor 801 can be defined as follows:

dependentGroupID (reference 803) that gives the identifier of a tile (as defined by a TileRegionGroupEntry descriptor), of a tile set (as defined by a TileSetGroupEntry descriptor), or of an HEVC layer (as defined by a HEVCLayerDefinitionBox descriptor, for example HEVCLayerDefinitionBox descriptor 802) on which this tile depends. The parameter is preferably set to 0 when dependencies are derived from the track reference box;

layerGroupID (reference 804) that gives the identifier of the HEVC layer (as defined by HEVCLayerDefinitionBox descriptor) to which this tile belongs. This parameter is set to 0 when dependencies are derived from the track reference box; and region_width and region_height that respectively define the width and height of the rectangular region represented by the tile, in term of luma samples, of the layer identified by layerGroupID parameter if its value is different from zero or of the frame as indicated in the visual sample entry of a 'stsd' box well known by the one skilled in the art and contained in the 'moov' box.

Similar new and modified parameters also apply to TileSetGroupEntry descriptor while modifying the number of bits used for encoding the groupID parameter (since tiling and scalability configurations are combined and a single namespace is used, the number of values for groupID parameter is to be increased).

Another needed adaptation is directed to the interpretation of the dependencyTileGroupID attribute that may define the identifier of a tile (as defined by a TileRegionGroupEntry descriptor), of a tile set (as defined by a TileSetGroupEntry descriptor), or of an HEVC layer (as defined by a HEVCLayerDefinitionBox descriptor) on which this tile set depends. If the value of the dependencyTileGroupID attribute is equal to zero, dependencies are derived from the track reference box.

For the sake of illustration, parameters of the new HEVCLayerDefinitionBox descriptor (reference 802) can be defined as follows:

groupID that is a unique identifier for the layer described by the group. Value 0 is reserved for special use in the 'nalm' box;

dependentGroupID that indicates the groupID identifier of an HEVC layer (as defined by a HEVCLayerDefinitionBox descriptor) on which the layer depends. If the value of the dependentGroupID parameter is equal to zero, dependencies are derived from the track reference box 'stsd' mentioned above. This is for example the case when an SHVC bit-stream enhances an AVC|H264 track;

visual Width that gives the value of the width of the coded picture or view in luma samples; and visualHeight that gives the value of the height of the coded picture or view in luma samples An advantage of having tiling referencing layer descriptor and having layer descriptor able to reference either tile or layer descriptor is to provide unified and flexible dependency signaling, all through the use of groupID identifiers. By unifying the identifier namespace for the groupID identifiers of tiles, tile sets and HEVC layers, and with the introduction of the two dependency identifiers (dependentGroupID and layerGroupID parameters), the following dependencies are simply defined:

dependencies between tiled layers;

dependencies between non-tiled layers;

dependencies between a non-tiled enhancement layer and a tiled base layer; and dependencies between a tiled enhancement layer and a non-tiled base layer.

It is to be noted that the solutions described by reference to FIGS. 6 to 8 are applicable in the case where layers or tiles are stored in different tracks, as could be the case for some DASH-based solution, if it is defined that the namespace for groupID identifiers is the base layer (e.g. the same value of groupID is not used in different tracks referring to the same base, having in mind that in most cases, groupID namespace's scope is associated with the moov box, since only one base layer of a video stream is present in a typical mp4 file).

FIG. 9, comprising FIGS. 9a and 9b, illustrates an example of encapsulating a tiled scalable video stream of the HEVC type as a single track into an mp4 file, according to a third embodiment. This embodiment is particularly adapted to the case according to which the number of NAL units per sample varies from one sample to another. FIG. 10 illustrates tile and scalable layer descriptors, according to a particular embodiment, to encapsulate an HEVC bit-stream.

As illustrated in FIG. 9a, that is similar to FIGS. 6a and 7a, it is assumed that the video stream comprises a base layer 900 that can be enhanced by the two independent spatial enhancement layers 901 and 902. Enhancement layer 901, referenced enhancement layer A, comprises tiles T1 and T2, and enhancement layer 902, referenced enhancement layer B, comprises tiles T1, T2, T3, and T4 (tile T1 and T2 of enhancement layer A being different from tiles T1 and T2 of enhancement layer B).

Again, turning to FIG. 9b, in order to encapsulate the tiled scalable video stream encoded according to the HEVC standard into mp4 file 910, video data are stored in mdat box 912 as a list of samples comprising, in particular, samples 919 and 921. Each sample is encoded as a set of one or more NAL units. The number of NAL units per sample may vary.

As illustrated, sample 919 comprises seven interlaced NAL units corresponding to the base layer (one NAL unit), the tiled enhancement layer A (two NAL units), and the tiled enhancement layer B (four NAL units) but sample 921 comprises nine interlaced NAL units corresponding to the base layer (one NAL unit), the tiled enhancement layer A (three NAL units), and the tiled enhancement layer B (five NAL units). Indeed, tile T3 of enhancement layer B is encapsulated in one NAL unit (reference 920) in sample 919 while it is encapsulated in two NAL units (reference 922 and 923 in sample 921).

When the number of NAL units per sample may vary, the NALUMapEntry descriptor as described above is not suitable to describe the samples and their NAL units with respect to tiles and scalability layers with only one NAL unit mapping.

According to a particular embodiment, it is possible to use mp4 aggregators to cope with such a variation of number of NAL units. However, since mp4 aggregators are specific to the SVC and/or MVC format, they are not available for HEVC standard and, in addition, this would require to insert particular NAL units when generating the mdat box and to rewrite the bit-stream when parsing the mdat box to extract the elementary stream. It is to be noted that analyzing the different NAL unit patterns in the samples can be done in order to create as many NALUMapEntries as NAL units patterns exist but this has a high description cost.

Still according to a particular embodiment, a default NAL unit mapping is used. Such a default NAL unit mapping can use the defaultSampleGroup mechanism introduced in Amendment 3 of MPEG-4 Part-12. It can be signaled in the NALUMapEntry descriptor 915. It is preferably chosen so as to correspond to the most common NAL unit pattern. Alternatively, such a default NAL unit mapping may correspond to the first NAL unit mapping or to a pre-defined configuration like one NAL unit per tile.

A particular value of the groupID parameter, for example the value zero, is reserved to signal a NALUMapEntry descriptor to be used as default (NALUMapEntry descriptor 915 in the example illustrated in FIG. 9).

In addition, the SubSampleInformation box introduced for HEVC file format is modified to introduce a new 'reserved' parameter, as illustrated with references 1001 and 1002 in FIG. 10, that is used in conjunction with NALUMapEntry descriptor corresponding to the default NAL unit mapping (i.e. reference 1005).

Accordingly, dynamic NALU maps can easily be defined since the SubSampleInformation box enables to describe each sub-sample or each group of sub-samples (reference 1004) of a sample or of a group of samples (reference 1003), wherein the sub-samples correspond, here to NAL units.

By overloading, for example, the "flags" parameter of the SubSampleInformation box, it is possible to define an additional kind of sub samples (after CTU-row, tiles, slices, and others defined in ISO/IEC 14496 Part 15) that are groupID based sub-samples.

In such a case, a sub-sample is mapped into a HEVC layer, a tile, or a tile set identified by its groupID as illustrated with reference 914 in FIG. 9. If a NALUMapEntry sample group description is present with a default default_sample_description_index, the default value is ignored (e.g. the SubSampleInformationBox descriptor overrides the definition present in the NALUMapEntry descriptor). If the value of groupID is equal to zero, no group is associated with this NALU.

If the value of groupID parameter is equal to zero, no group is associated with this NAL unit (or group of NAL units), meaning that the NAL unit (or group of NAL units) is associated to the groupID parameter declared for this NAL unit (or group of NAL units) in the default NALUMapEntry descriptor. This is the case, for example, with 'subs' box 914 in FIG. 9b where the NAL units of sample i (919) follow the default mapping while an explicit mapping is provided for sample j (921).

This combination provides a simple way to describe temporary modifications of a default NALU pattern that is regularly used. Such a description enables a parser to easily build a mapping between groups of NAL units and their position in mdat box since the SubSampleInformationBox box provides the size in bytes of the subsample (NAL unit) or group of subsamples (group of NAL units). It facilitates data extraction according to a given criterion, for example data pertaining to a spatial area or to a given layer.

FIG. 11, comprising FIG. 11a and FIG. 11b, is a flow chart illustrating steps for transmitting timed media data between a server and a client device according to a particular embodiment. Steps shown in FIG. 11a are implemented within the server to prepare a media presentation by creating segment files adapted to ROI streaming from a tiled timed media data bit-stream while steps shown in FIG. 11b are implemented within the client device.

In a first step (step 1100), the video stream is compressed into scalable video with one or more layers, especially in high resolution, containing tiles. In a following step (step 1102), the server identifies all NAL units that are associated with the tiles and, for each tile, creates a tile descriptor containing sub-samples composed of all NAL units corresponding to the given tile. In the meantime, it associates a scalability layer descriptor to each tile. In case of non-tiled layer, only the scalability layer descriptor is associated with the NAL units. For example, the server may rely on sub-picture level SEI messages to identify the association of NAL units with different regions and on sequence-level SEI messages for identifying the position and size of each ROI as it has been proposed in HEVC standardization (proposal JCTVC-K0128).

Next, in step 1104, the server generates and stores an initialization segment file and media segment files containing temporal period according to the ISO BMFF representation, as described with reference to FIGS. 3 and 6. All the timed media data tracks (e.g. video tracks) are stored in separate media segment files (temporally segmented).

The server then serves, on request, the initialization and media segment files to a client device (step 1106). The server may be a conventional HTTP server that responds to HTTP requests.

In the context of HTTP streaming and in a preferred embodiment, it is assumed that the client device has access to a manifest file describing the media presentation available from the server. This manifest file provides sufficient information (media properties and a list of segments) for the client device to stream the media presentation by first requesting the initialization segments and then media segment files from the server.

Upon selection of a ROI at the client device end, typically on a display with selecting means such as a pointing device, during the streaming of a tiled video, the tiles corresponding to the selected ROI are determined (step 1108 in FIG. 11b).

Next, for each temporal period, in case of scalable media data, the client device sends a request to the server to download the segment files corresponding to dependent layers (step 1110). According to a particular embodiment, the layers that are depended from are downloaded before the layers depending from those depended from layers. For example, base layer segment files are downloaded before enhancement layer segment files.

In a following step, the client device sends a request to the server to download the media segment files corresponding to selected tiles (step 1112).

Next, the downloaded segment files are concatenated by the client device to build a valid (decodable) timed media data bit-stream conforming to the ISO BMFF standard (step 1114), corresponding to the selected ROI.

Figure 12:
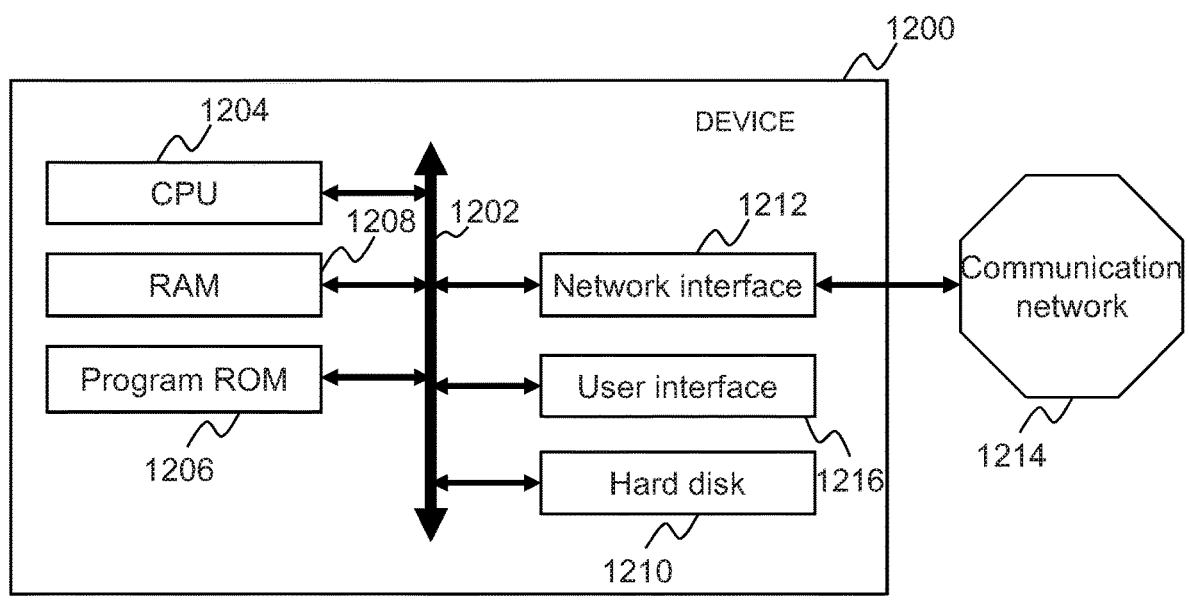
FIG. 12 represents a block diagram of a server or a client device in which steps of one or more embodiments may be implemented.

FIG. 12 represents a block diagram of a server or a client device 1200 in which steps of one or more embodiments may be implemented.

Preferably, the device 1200 comprises a communication bus 1202, a central processing unit (CPU) 1204 capable of executing instructions from program ROM 1206 on powering up of the device, and instructions relating to a software application from main memory 1208 after the powering up. The main memory 1208 is for example of Random Access Memory (RAM) type which functions as a working area of CPU 1204 via the communication bus 1202, and the memory capacity thereof can be expanded by an optional RAM connected to an expansion port (not illustrated). Instructions relating to the software application may be loaded to the main memory 1208 from a hard-disc (HD) 1210 or the program ROM 1206 for example. Such software application, when executed by the CPU 1204, causes the steps described with reference to FIG. 11a to be performed in the server and the steps described with reference to FIG. 11b to be performed in the client device.

Reference numeral 1212 is a network interface that allows the connection of the device 1200 to the communication network 1214. The software application when executed by the CPU 1204 is adapted to react to requests received through the network interface and to provide data streams and requests via the network to other devices.

Reference numeral 1216 represents user interfaces to display information to, and/or receive inputs from, a user.

It should be pointed out here that, as a variant, the device 1200 for managing the reception or sending of multimedia bit-streams can consist of one or more dedicated integrated circuits (ASIC) that are capable of implementing the method as described with reference to FIGS. 11a and 11b. These integrated circuits are for example and non-restrictively, integrated into an apparatus for generating or displaying video sequences and/or for listening audio sequences.

As described above, an embodiment of the invention can apply, in particular, to the video format known as HEVC.

According to HEVC standard, images can be spatially divided in tiles, slices, and slice segments. In this standard, a tile corresponds to a rectangular region of an image that is defined by horizontal and vertical boundaries (i.e., rows and columns). It contains an integer number of Coding Tree Units (CTU). Therefore, tiles can be efficiently used to identify regions of interest by defining, for example, positions and sizes for regions of interest. However, the structure of a HEVC bit-stream as well as its encapsulation as Network Abstract Layer (NAL) units are not organized in view of tiles but are based on slices.

In HEVC standard, slices are sets of slice segments, the first slice segment of a set of slice segments being an independent slice segment, that is to say a slice segment that general information stored within a header does not refer to the one of another slice segment. The other slice segments of the set of slice segments, if any, are dependent slice segments (i.e. slice segments that general information stored within a header refers to the one of an independent slice segment).

A slice segment contains an integer number of consecutive (in raster scan order) Coding Tree Units. Therefore, a slice segment can be of a rectangular shape or not and so, it is not suited to represent a region of interest. It is encoded in a HEVC bit-stream under the form of a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bit-stream that are used to define tiles or as entropy decoding synchronization points.

Figure 13A:
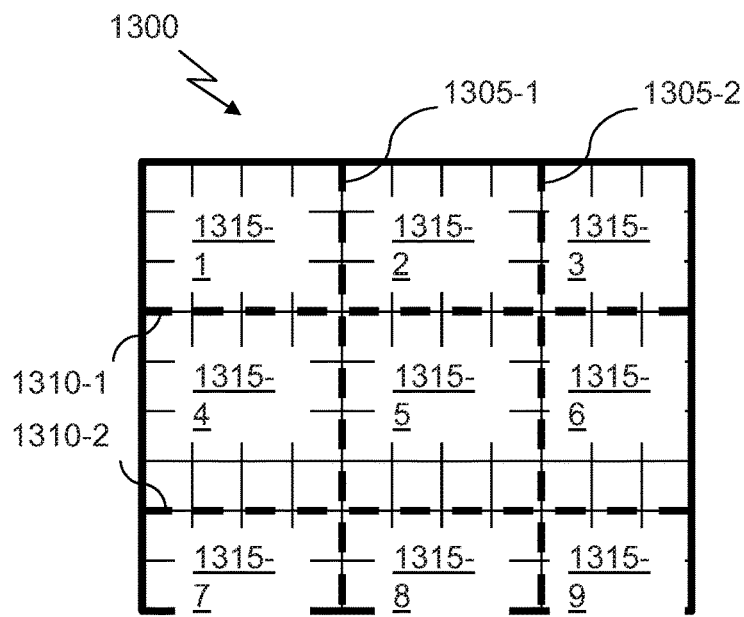
FIGS. 13a, 13b, and 13c, illustrate examples of tiles and slice segments in a HEVC bit-stream.
Figure 13B:
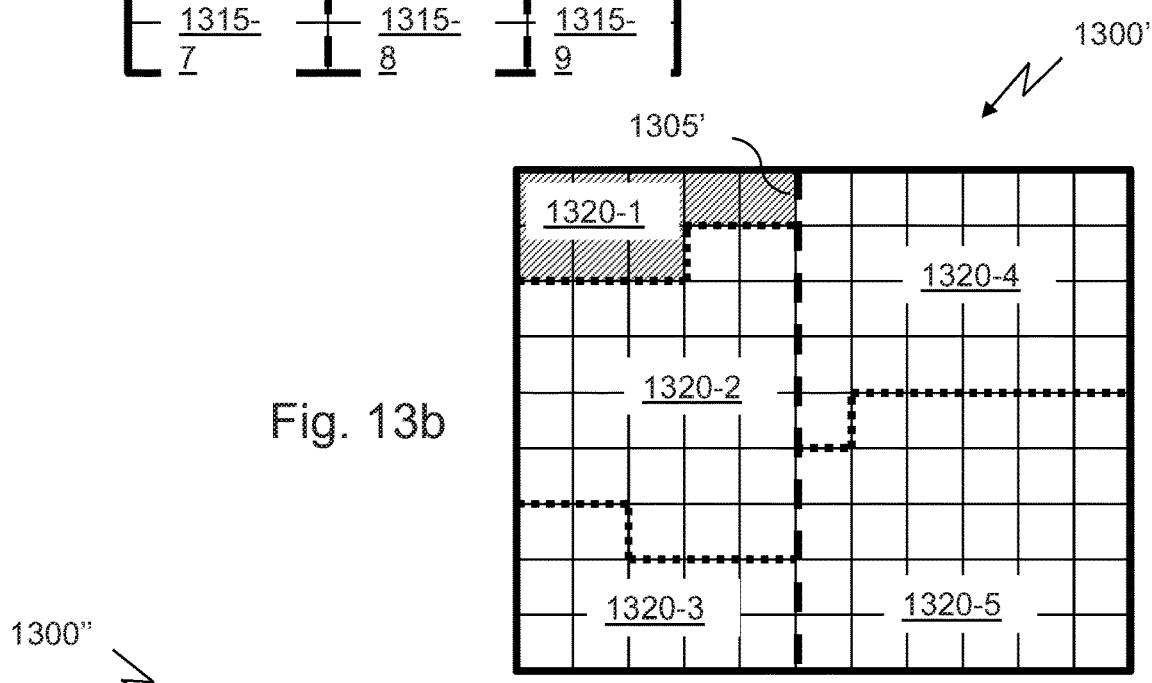
Figure 13C:
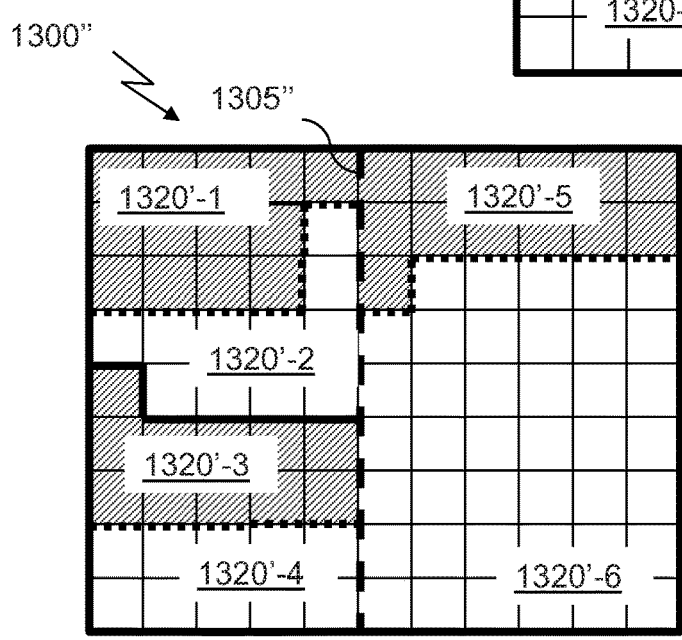

FIG. 13, comprising FIGS. 13a, 13b, and 13c, illustrates examples of tiles and slice segments. More precisely, FIG. 13a illustrates an image (1300) divided in nine portions by vertical boundaries 1305-1 and 1305-2 and horizontal boundaries 1310-1 and 1310-2. Each of the nine portions referenced 1315-1 to 1315-9 represents a particular tile.

FIG. 13b illustrates an image (1300') containing two vertical tiles delimited by vertical boundary 1305'. Image 1300' comprises a single slice (not referenced) containing five slice segments, one independent slice segment 1320-1 (represented with hatched lines) and four dependent slice segments 1320-2 to 1320-5.

FIG. 13c illustrates an image (1300") containing two vertical tiles delimited by vertical boundary 1305". The left tile comprises two slices: a first slice containing one independent slice segment (1320'-1) and one dependent slice segment (1320'-2) and a second slice also containing one independent slice segment (1320'-3) and one dependent slice segment (1320'-4). The right tile comprises one slice containing one independent slice segment (1320'-5) and one dependent slice segment (1320'-6).

According to HEVC standard, slice segments are linked to tiles according to rules that may be summarized as follows (one or both conditions have to be met):
- all CTUs in a slice segment belong to the same tile (i.e. a slice segment cannot belong to several tiles); and
- all CTUs in a tile belong to the same slice segment (i.e. a tile may be divided into several slice segments provided that each of these slice segments only belongs to that tile).

For the sake of clarity, it is considered in the following that one tile contains one slice having only one independent slice segment. However, embodiments of the invention can be carried out with other configurations like the ones illustrated in FIGS. 13b and 13c.

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to HEVC standard, the type of a NAL unit is encoded in two bytes of the NAL unit header that can be defined as follows:

```
nal_unit_header ( ) {
    forbidden_zero_bit
    nal_unit_type
    nuh_layer_id
    nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
    first_slice_segment_in_pic_flag
    if(nal_unit_type >= BLA_W_LP && nal_unit_type <= RSV_IRAP_
```

-continued

```
VCL23)
    no_output_of_prior_pics_flag
slice_pic_parameter_set_id
if(!first_slice_segment_in_pic_flag){
    if(dependent_slice_segments_enabled_flag)
        dependent_slice_segment_flag
    slice_segment_address
}
If(!dependent_slice_segment_flag){
    [. . .]
```

Tiling information is provided in a PPS (Picture Parameter Set) NAL unit. The relation between a slice segment and a tile can then be deduced from these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in HEVC standard. It is set in slice segment header with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

When a video bit-stream is encoded as a set of independent tiles, it then enables a tile-based decoding from one frame to another without any risk for missing reference data or propagation of reconstruction errors. This configuration then enables to reconstruct only a spatial part of the original video that can correspond, for example, to the region of interest illustrated in FIG. 2 (comprising tiles 3 and 7). Such a configuration can be indicated as supplemental information in a video bit-stream so as to indicate that tile-based decoding is reliable.

According to an embodiment of the invention, an efficient access to tiles in the context of HTTP streaming is provided by using the ISO BMFF file format applied to HEVC standard. Accordingly, each of the independent tiles to be coded (e.g. each of the twelve tiles represented in FIG. 2) is encapsulated with associated descriptor called a "TileRegionGroupEntry" as described below by reference to FIG. 6.

As described above, the initialization segment file is used to transmit all the metadata that are necessary to define timed media data bit-streams encapsulated in other media segment files. An initialization segment file contains a file type box 'ftyp' and a movie box 'moov'. File type box preferably identifies which ISO BMF specifications the segment files comply with and indicates a version number of that specification. Movie box 'moov' provides all the metadata describing the presentation stored in media segment files and in particular all tracks available in the presentation.

Movie box contains a definition for each of the tracks ('trak' boxes).

Each track box contains at least a track header box 'tkhd' and a track media box 'mdia'. If a track depends on data from other tracks, there is also a track reference box 'tref'.

As mentioned above, it is to be noted that other boxes may be mandatory or optional depending on ISO BMFF specifications used to encapsulate the timed media data bit-stream. However, since embodiments of the invention do not rely on these boxes to be applicable, they are not presented here.

According to the embodiment described by reference to FIG. 6, signalization of the position of the tile in the full video, the size of the tile, and of the indication that the tile track can be decoded without any artifact is done once for the whole HEVC bit-stream to be encapsulated, in the 'moov' box (611), in each track definition, using the track header box 'tkhd' (not represented) and boxes of the media information box 'mdia' (not represented).

According to a particular embodiment that is adapted to handle variation in tiling configuration along a video sequence, tile signaling is done at a sample level, using the sample grouping mechanisms from the ISO BMFF standard.

Such sample grouping mechanisms are used for representing partitions of samples in tracks. They rely on the use of two boxes: a SampleToGroup box ('sbgp') that describes the assignment of samples to sample groups and a SampleGroupDescription box ('sgpd') that describes common properties of samples within a particular sample group. A particular type of sample grouping is defined by the combination of one SampleToGroup box and one SampleGroupDescription box via a type field ('grouping_type'). Multiple sample grouping instances (i.e. pair of SampleToGroup and SampleGroupDescription boxes) can exist based on different grouping criteria.

According to particular embodiments, a grouping criterion related to the tiling of samples is defined. This grouping_type, called 'tile', describes the properties of a tile and is derived from the standard VisualSampleGroupEntry. It can be referred to as TileRegionGroupEntry and is defined as follows:

```
class TileRegionGroupEntry ( ) extends VisualSampleGroupEntry ('trif') {
    unsigned int(32) groupID;
    unsigned int(2) independent;
    unsigned int(6) reserved=0;
    unsigned int(16) horizontal_offset;
    unsigned int(16) vertical_offset;
    unsigned int(16) region_width;
    unsigned int(16) region_height;
}
```

According to this new type of group entry, groupID parameter is a unique identifier for the tile described by the group. horizontal_offset and vertical_offset parameters are used to set an horizontal and a vertical offset, respectively, of the top-left pixel of the rectangular region represented by the tile, relative to the top-left pixel of the HEVC frame, in luma samples of the base region. region_width and region_height parameters are used to set the width and height, respectively, of the rectangular region represented by the tile, in luma samples of the HEVC frame. independent parameter is a 2-bit word that specifies that the tile comprises decoding dependencies related to samples only belonging to the same tile, as described above be reference to the definition of independent tiles. For the sake of illustration and referring to a standard use of SEI messages for describing tile organization, the flag known as tile_section_exact_match_flag can be used to set the value of the independent flag. The meaning of the latter can be set as follows:

if independent parameter equals 0, the coding dependencies between this tile and other tiles in the same frame or in previous frames is unknown;

if independent parameter equals 1, there are no spatial coding dependencies between this tile and other tiles in the same frame but there can be coding dependencies between this tile and the tile having the same tileID in the previous frames, and if independent parameter equals 2, there are no coding dependencies between this tile and other tiles having the same tileD in the same frame or in previous frames; the independent parameter value 3 being reserved.

Optionally, a parameter describing an average bitrate per tile can be set in the tile descriptor so as to be provided to streaming client for adaptation based on bandwidth.

According to an embodiment, the properties of each tile are given once in the movie header ('moov' box) by defining, for each tile track, one SampleGroupDescription box ('sgpd') with the 'trif' grouping_type and a TileRegionGroupEntry. Then, according to ISO BMFF standard, a SampleToGroup box is defined in each tile track fragment to associate each sample of the tile track fragment with its properties since the number of samples is not known in advance.

FIG. 14, comprising FIG. 14a and FIG. 14b, illustrates an example of signaling the position of a tile in a full video, the size of the tile, and an indication that the tile track can be decoded without any artifact, at sub-sample level, adapted to handle various tiling configuration.

FIG. 14a illustrates steps carried out by a client device (e.g. a video player) while FIG. 14b illustrates an example of a file comprising a single track wherein a tiled scalable video stream of the HEVC type is encapsulated. More precisely, FIG. 14b illustrates example of tiling description.

In a first step (step 1400), the client device downloads initialization data or reads initialization data if the file is a local file, for example initialization data of an encapsulated bit-stream conforming to MPEG-4 standard, typically the content of a moov box.

From these initialization data, the client device can parse track information contained in the trak box, in particular the sample table box where sample information and description are coded (step 1405). Next, at step 1410, the client device builds a list of all the available sample description boxes (for example sample description boxes 1470 and 1475 in FIG. 14b). As a result, the client device is in possession of full list of groupIDs that are referenced from the NALUMapEntry descriptor (e.g. NALUMapEntry box 1470).

Therefore, the sample descriptions enable the client device, for the particular case of tiled and scalable video, to determine which NAL units have to be downloaded (in case of transmission use) or extracted (in case of local file) to render a particular region of interest in a given resolution or quality. The tile and layer selection can be done via a graphical interface of the client device (step 1415) that renders the tile description and scalability information. One or more tile or/and scalability layers can be selected.

It is to be noted that the parsing step 1410 can be followed by an optional indexation step, carried out in an internal data structure, in order to associate a list of byte-range to each corresponding configuration (tile, layer, sample) in the mdat box (e.g. reference 1460). Building such an internal data structure allows an internal client device to download or extract more rapidly the data for a given configuration (tile, layer, sample). This optional parsing step can also be done at server side when compressed video data are being encapsulated. It could then be used to inform on byte ranges to download the tiles or a specific layer and for the server to extract more rapidly a given (tile, layer, sample) configuration.

Next, the data are downloaded or read by the client device (steps 1420) and the extracted or received data (samples from the mdat box 1460) are provided to the video decoder for display (step 1425).

As illustrated in FIG. 14*b*, tiling description 1450 comprises movie box "moov" 1455 and 'mdat' data box 1460. box 1455 contains one SampleTable box per track that contains a SampleToGroup box 1465 that describes the different sample groups, a sample group description box 1470 that describes the mapping between NAL units of each sample and the tiles, and a sample group description box 1475 that contains the tile descriptions. The sample to group box 1465 indicates the 'nalm' grouping type for the group entry NALUMapEntry descriptor.

Figure 15B:
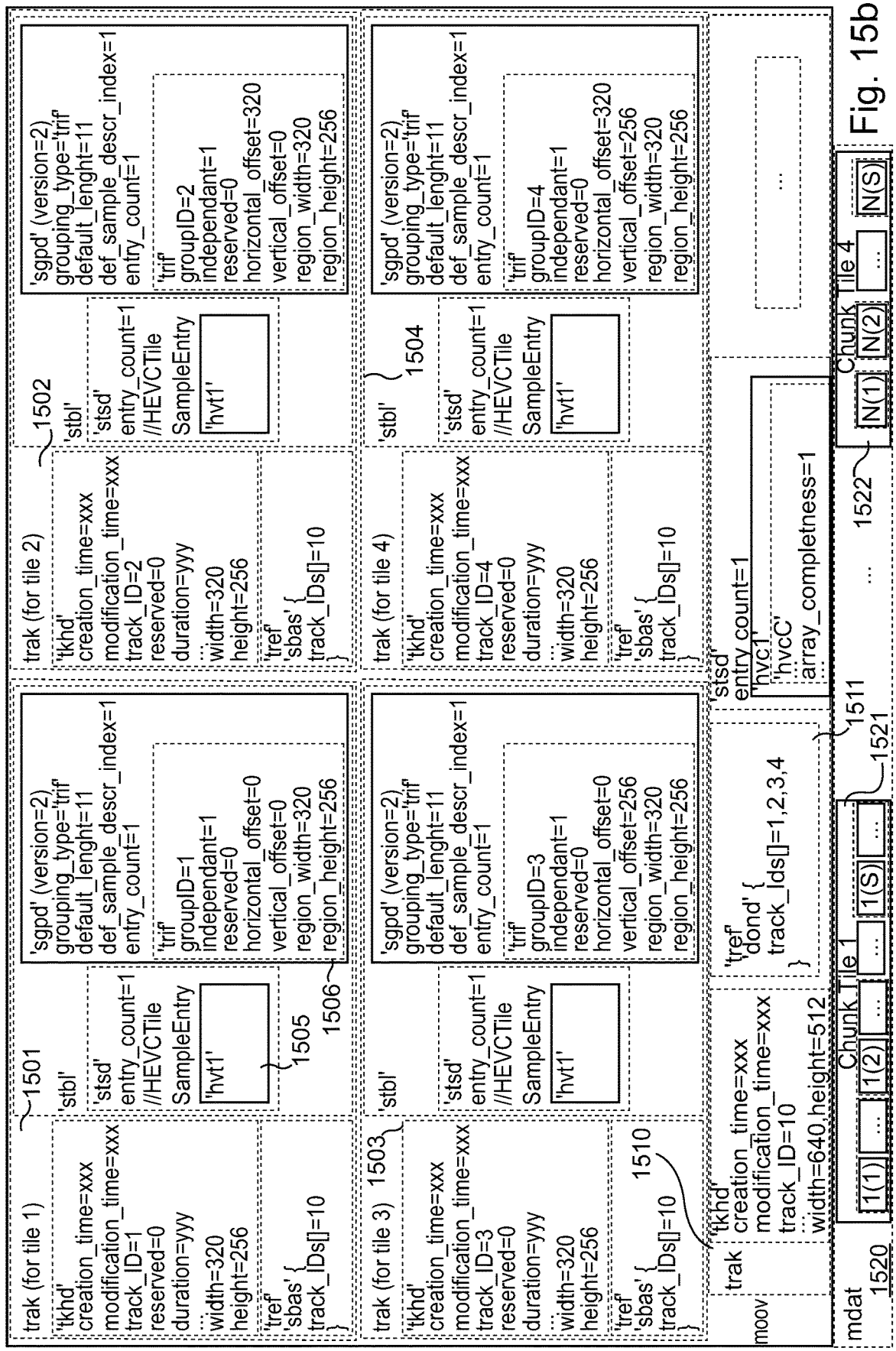

FIG. 15, comprising FIGS. 15*a* and 15*b*, illustrates an example of encapsulating tiles in multiple tracks, for efficient data addressing.

FIG. 15*a* illustrates an example of tile configuration. For the sake of illustration, it comprises four tiles (tile 1 to tile 4), the size of each tile being 310 pixel width and 256 pixel height.

As illustrated in FIG. 15*b*, each tile is encapsulated in its own track, leading to encapsulating the video as 5 tracks: four tile tracks referenced 1501, 1502, 1503, and 1504 for encapsulating each tile and one parameter set track 1510 common to all tile tracks.

A HEVC tile track is a video track for which there is either a 'dond' (decoding order dependency) track reference from a base HEVC layer or a 'sbas' reference to the HEVC layer.

The description of each tile track (1501, 1502, 1503, and 1504) is based on a TileRegionGroupEntry box (identified by the 'trif' reference), such as TileRegionGroupEntry box 1506.

Here, the 'trif' boxes use the default sample grouping mechanism (with attribute def_sample_descr_index=1) to indicate that all samples of the track have the same tile description. For example, the NAL units 1521 corresponding to tile 1 are described in track 1 (referenced 1501) in the TileRegionGroupEntry box 1506.

There is no need here for a NALUMapEntry descriptor since all samples in a given track map to the tile described by this track. References 1521 and 1522 designate, respectively, data chunks that contain data for tile 1 and tile 4 from time 1 to time S (duration of the media file or media segment in case of track fragments).

Actually the track samples are not the classical video samples since in this embodiment, they are tile samples: a sample stored in a tile track is a complete set of slices for one or more tiles, as defined in ISO/IEC 23008-2 (HEVC). A HEVC sample stored in a tile track is considered as a sync sample if the VCL NAL units in the sample indicate that the coded slices contained in the sample are Instantaneous Decoding Refresh (IDR) slices, Clean Random Access (CRA) slices, or Broken Link Access (BLA) slices. As such, they do not have the same sizes as classical samples would have: according to the example of FIG. 15*a*, classical HEVC samples would have a size of 640×512 pixels while here, the HEVC samples stored in each tile track have a size of 320×256 pixels. In order to avoid ambiguity at parsing time, the tile samples are signaled with a new type of VisualSampleEntry descriptor: the HEVCTileSampleEntry descriptor, such as HEVCTileSampleEntry descriptor 1505 associated to track 1 (designated with 4-letter code 'hvt1').

It is to be noted that for TileSetGroupEntry, description in an independent track, HEVCTileSampleEntries, could also be used. In this case, size of the samples would be the size of the bounding box of the tile set.

In addition to size information, any relevant information to describe the sample could be placed in this HEVCTileSampleEntry as optional extra_boxes.

Formally, the sample entries of HEVC video tracks are HEVCSampleEntries declared in the Sample Description box of each track header. Here, since multiple tracks representing the same video stream are used, each tile track comprises an indication according to which the samples in the track are actually samples of a sub part of a complete video stream, indicating that these samples are HEVCTileSampleEntry (each 'hvt1' box in the Sample Description box 'stsd' of each track).

For the sample description type 'hvt1', neither the samples in the tile track or the sample description box shall contain PS, SPS or PPS NAL units, these NAL units shall be in the samples or in the sample description box of the track containing the base layer (as identified by the track references) in case of scalability or in a dedicated track such as dedicated track 1510 in FIG. 15*b*.

Sub-sample and sample grouping defined for regular HEVC samples have the same definitions for an HEVC tile sample. The dependencies between the parameter set track 1510 and the tile tracks are described via the decoding order dependencies 'dond' referenced 1511. It is recommended to use 'dond' track references since they provide order information, which can be used to reconstruct the original bitstream without parsing slice headers to get the tiles order (here, 1, 2, 3, and 4).

When tiles of an HEVC video are stored in different tracks, there can be cases where no samples exist in the base layer. How and whether the tile samples are re-assembled to form a conformant HEVC bitstream is left up to the implementation.

Naturally, in order to satisfy local and specific requirements, a person skilled in the art may apply to the solution described above many modifications and alterations all of which, however, are included within the scope of protection of the invention as defined by the following claims.

The invention claimed is:

1. A method for generating a media file, the method comprising:
   generating a first data structure assigning a subset of samples of a track to one or more sample groups, each sample of the subset comprising one or more network abstraction layer (NAL) units;
   generating a second data structure for describing each of the one or more sample groups, the first and second data structures comprising a first grouping type indicating a mapping between NAL units and the one or more sample groups, the second data structure associating a sample group identifier to a NAL unit;
   generating a third data structure for describing a tile region, the third data structure comprising a second grouping type indicating that the samples of the track comprise one or more tile regions; and
   generating a media file including the samples and including a metadata part, the metadata part comprising the first, second and third data structures, and the metadata part comprising a reference grouping type for linking the second and third data structures.

2. The method according to claim 1, wherein the reference grouping type is identified by a four letters code, wherein the four letters code is 'trif'.

3. The method according to claim 1, wherein the second grouping type is identified by a four letters code, wherein the four letters code is 'trif'.

4. The method according to claim 1, wherein the first grouping type is identified by a four letters code, wherein the four letters code is 'nalm'.

5. The method according to claim 1, wherein the NAL units are coded based on HEVC (High Efficiency Video Coding).

6. The method according to claim 1, wherein each of the samples is an image within a sequence of images.

7. An apparatus for generating a media file, the apparatus comprising:
- a grouping structure generation unit configured to
  - generate a first data structure assigning a subset of samples of a track to one or more sample groups, each sample of the subset comprising one or more network abstraction layer (NAL) units;
  - generate a second data structure for describing each of the one or more sample groups, the first and second data structures comprising a first grouping type indicating a mapping between NAL units and the one or more sample groups, the second data structure associating a sample group identifier to a NAL unit;
  - generate a third data structure for describing a tile region, the third data structure comprising a second grouping type indicating that the samples of the track comprise one or more tile regions; and
- a media file generation unit configured to generate a media file including the samples and including a metadata part, the metadata part comprising the first, second and third data structures, and the metadata part comprising a reference grouping type for linking the second and third data structures.

8. The apparatus according to claim 7, wherein the reference grouping type is identified by a four letters code, wherein the four letters code is 'trif'.

9. The apparatus according to claim 7, wherein the second grouping type is identified by a four letters code, wherein the four letters code is 'trif'.

10. The apparatus according to claim 7, wherein the first grouping type is identified by a four letters code, wherein the four letters code is 'nalm'.

11. The apparatus according to claim 7, wherein the NAL units are coded based on HEVC (High Efficiency Video Coding).

12. The apparatus according to claim 7, wherein each of the samples is an image within a sequence of images.

13. A non-transitory computer-readable medium storing a computer program for causing a computer to execute a method for generating a media file, the method comprising:
- generating a first data structure assigning a subset of samples of a track to one or more sample groups, each sample of the subset comprising one or more network abstraction layer (NAL) units;
- generating a second data structure for describing each of the one or more sample groups, the first and second data structures comprising a first grouping type indicating a mapping between NAL units and the one or more sample groups, the second data structure associating a sample group identifier to a NAL unit;
- generating a third data structure for describing a tile region, the third data structure comprising a second grouping type indicating that the samples of the track comprise one or more tile regions; and
- generating a media file including the samples and including a metadata part, the metadata part comprising the first, second and third data structures, and the metadata part comprising a reference grouping type for linking the second and third data structures.

14. A method for rendering a video from a media file, the method comprising:
- obtaining from a metadata part of the media file a first data structure assigning a subset of samples of a track to one or more sample groups, each sample of the subset comprising one or more network abstraction layer (NAL) units;
- obtaining from the metadata part of the media file a second data structure for describing each of the one or more sample groups, the first and second data structures comprising a first grouping type indicating a mapping between NAL units and the one or more sample groups, the second data structure associating a sample group identifier to a NAL unit;
- obtaining from the metadata part of the media file a third data structure for describing a tile region, the third data structure comprising a second grouping type indicating that the samples of the track comprise one or more tile regions;
- obtaining from the metadata part of the media file a reference grouping type for linking the second and third data structures; and
- rendering the video based on the samples and the first, second and third data structures.

15. A device for rendering a video from a media file, the device comprising a processor configured for:
- obtaining from a metadata part of the media file a first data structure assigning a subset of samples of a track to one or more sample groups, each sample of the subset comprising one or more network abstraction layer (NAL) units;
- obtaining from the metadata part of the media file a second data structure for describing each of the one or more sample groups, the first and second data structures comprising a first grouping type indicating a mapping between NAL units and the one or more sample groups, the second data structure associating a sample group identifier to a NAL unit;
- obtaining from the metadata part of the media file a third data structure for describing a tile region, the third data structure comprising a second grouping type indicating that the samples of the track comprise one or more tile regions;
- obtaining from the metadata part of the media file a reference grouping type for linking the second and third data structures; and
- rendering the video based on the samples and the first, second and third data structures.

* * * * *